US012757225B2

(12) United States Patent
Fan et al.

(10) Patent No.: US 12,757,225 B2
(45) Date of Patent: Oct. 6, 2026

(54) METHOD FOR CONFIGURING A SIDELINK RESOURCE AND COMMUNICATION APPARATUS

(71) Applicant: HUAWEI TECHNOLOGIES CO., LTD., Shenzhen (CN)

(72) Inventors: Weiwei Fan, Shenzhen (CN); Chunxu Jiao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 292 days.

(21) Appl. No.: 18/478,935

(22) Filed: Sep. 29, 2023

(65) Prior Publication Data

US 2024/0032069 A1 Jan. 25, 2024

Related U.S. Application Data

(63) Continuation of application No. PCT/CN2021/085991, filed on Apr. 8, 2021.

(51) Int. Cl.
*H04W 72/25* (2023.01)
*H04W 72/0446* (2023.01)

(52) U.S. Cl.
CPC ....... *H04W 72/25* (2023.01); *H04W 72/0446* (2013.01)

(58) Field of Classification Search
CPC ... H04W 72/25; H04W 72/0446; H04W 4/70; H04W 72/40; H04L 2001/0092;
(Continued)

(56) References Cited

U.S. PATENT DOCUMENTS

2020/0366532 A1* 11/2020 Brunel ................ H04L 27/2646
2020/0374978 A1 11/2020 Panteleev et al.
2021/0058905 A1* 2/2021 Ganesan .............. H04L 1/1861

FOREIGN PATENT DOCUMENTS

CN 108141725 A 6/2018
CN 110445597 A 11/2019
(Continued)

OTHER PUBLICATIONS

3GPP TR 37.985 V16.0.0, 3rd Generation Partnership Project; Technical Specification Group Radio Access Network; Overall description of Radio Access Network (RAN) aspects for Vehicle-to-everything (V2X) based on LTE and NR (Release 16) (Year: 2020).*

(Continued)

*Primary Examiner* — Andrew W Chriss
(74) *Attorney, Agent, or Firm* — WOMBLE BOND DICKINSON (US) LLP

(57) ABSTRACT

This application provides a method for configuring a sidelink resource and a communication apparatus. A transmit end user may indicate, by using SCI based on a preempted COT, that last several symbols in a slot are blank symbols, and a receive end may perform LBT in the COT based on a reserved blank, to implement COT sharing. In addition, after the COT is preempted, the transmit end user may flexibly configure periodicity information of a PSFCH resource, and send the periodicity information of the PSFCH resource to a receive end user. With reference to frame structure information, a position of a PSFCH slot in a slot in a corresponding direction can be calculated by users of the transmit end and the receive end by using a modulo operation, to feed back HARQ information in a corresponding slot in which the PSFCH exists.

9 Claims, 8 Drawing Sheets

(58) Field of Classification Search
CPC ... H04L 1/1854; H04L 5/0053; H04L 5/0094; H04L 27/2646; H04L 27/2666
See application file for complete search history.

(56) References Cited

FOREIGN PATENT DOCUMENTS

| | | | | |
|---|---|---|---|---|
| CN | 110831201 A | | 2/2020 | |
| WO | WO-2021026885 A1 | * | 2/2021 | ............ H04W 72/23 |

OTHER PUBLICATIONS

Lien et al., “3GPP NR Sidelink Transmissions Toward 5G V2X”, IEEE Access, vol. 9 (Year: 2020).*
Nokia, Nokia Shanghai Bell:“Remaining details of Physical layer structure for sidelink”.3GPP TSG RAN WG1 #101-e Meeting, May 25-Jun. 5, 2020, R1-2003308, total 8 pages.

* cited by examiner

METHOD FOR CONFIGURING A SIDELINK RESOURCE AND COMMUNICATION APPARATUS

CROSS-REFERENCE TO RELATED APPLICATIONS

This application is a continuation of International Application No. PCT/CN2021/085991, filed on Apr. 8, 2021, the disclosure of which is hereby incorporated by reference in its entirety.

TECHNICAL FIELD

This application relates to the communication field, and more specifically, to a method for configuring a sidelink resource and a communication apparatus.

BACKGROUND

A device-to-device (D2D) network communication technology is a communication manner in which two user nodes directly communicate with each other. Based on different frequency bands in which the D2D technology works, the D2D technology may be classified into a D2D technology that works in a licensed frequency band, such as new radio access technology-vehicle to other devices (new radio access technology-vehicle to X, NR-V2X), and a D2D technology that works in an unlicensed frequency band, such as a wireless network (Wi-Fi) and a Bluetooth technology.

To avoid a conflict between D2D communication and universal interface (universal user, Uu) communication, the standard specifies a resource pool for D2D communication, that is, a base station configures, through RRC signaling, some common time-frequency resources for D2D transmission.

Currently, a resource pool configured in NR-V2X supports data sending in only one direction. A time-frequency resource in the resource pool is periodic, and there is a fixed gap between sidelink slots in the resource pool. This is applicable to a scenario of the Internet of Vehicles of periodic small-packet services in which fast feedback of demodulation results is required. The resource pool configured in NR-V2X is not flexible enough. Therefore, NR-V2X is not applicable to large-packet aperiodic services, such as AR/VR data transmission.

In addition, in the unlicensed frequency band, a transmit node needs to listen to a busy state or an idle state of a channel, and the node can access the channel to transmit a signal only when the channel is idle. Therefore, a fixed resource pool resource configuration manner is not applicable to the unlicensed frequency band.

In view of this, how to implement flexible D2D resource configuration becomes an urgent problem to be resolved.

SUMMARY

This application provides a method for configuring a sidelink resource and a communication apparatus, to implement flexible D2D resource configuration.

According to a first aspect, a method for configuring a sidelink resource is provided, which may be applied to a first terminal device, or may be applied to a component (such as a chip, a chip system, or a processor) in a first terminal device, The method includes: receiving first sidelink control information SCI in a first slot, where the first SCI includes first indication information, the first indication information indicates whether a blank symbol exists in the first slot, and the blank symbol is located in last N symbols of the first slot, where N is a natural number; and determining, based on the first indication information, whether the blank symbol exists in the first slot.

Because the first terminal device is configured to receive the first SCI, the first terminal device may be understood as a receive end device in the method.

The foregoing technical solution is applicable to an unlicensed D2D technology. When the last N symbols of the first slot are blank symbols, a receive end may listen for a busy or an idle state of a channel on the blank symbol of the first slot, and perform a transmit/receive switching, to implement COT sharing in an unlicensed frequency band. In addition, for a scenario in which some data packets are periodically sent or some small data packets are sent, existence of a blank symbol in each slot may not affect data sending. However, for a scenario in which large data packets are continuously sent, transmission period of some large data packets may occupy a plurality of consecutive slots. A blank symbol is additionally reserved in each slot, causing a data packet not to be continuously sent due to the existence of a blank symbol, thereby causing waste of resources. However, in this application, when the last N symbols of the first slot are not blank symbols, a requirement for continuous sending of some large data packets can be met.

For example, a structure of a COT frame preempted by a transmit end in an unlicensed frequency band is TTTTRRR, and each T or R corresponds to a slot. The transmit end sends sidelink information in a slot corresponding to T, the receive end receives the sidelink information in a slot corresponding to R, and a slot configured as R in the COT may be shared with the receive end for sending the sidelink information. To implement COT sharing, the transmit end may reserve several blank symbols for the receive end in advance in a last T slot of the COT frame structure, so that the receive end can listen for a busy or an idle state of the channel. When the channel is idle, the receive end may share an R slot in the COT frame structure, that is, the receive end may send the sidelink information in the R slot.

In an embodiment, the method further includes: If the first indication information indicates that a blank symbol exists in the first slot, the first terminal device determines a quantity N of blank symbols in the first slot based on the first indication information and a subcarrier spacing of the first slot.

In an embodiment, the subcarrier spacing of the first slot is 15 kHz or 30 kHz, and the quantity N of blank symbols is 1; or the subcarrier spacing of the first slot is 60 kHz, and the quantity N of blank symbols is 2.

According to a second aspect, a method for configuring a sidelink resource is provided, which may be applied to a second terminal device, or may be applied to a component (such as a chip, a chip system, or a processor) in the second terminal device, The method includes: determining first indication information, where the first indication information is carried in first sidelink control information SCI, the first indication information indicates whether a blank symbol exists in a first slot, and the blank symbol is located in last N symbols of the first slot, where N is a natural number; and sending the first SCI in the first slot.

Because the second terminal device is configured to send the first SCI, the second terminal device may be understood as a transmit end device in the method.

For beneficial effects of the second aspect, refer to the description in the first aspect. Details are not described herein again.

In an embodiment, the method further includes: The second terminal device determines a quantity N of blank symbols in the first slot based on a subcarrier spacing of the first slot.

In an embodiment, the subcarrier spacing of the first slot is 15 kHz or 30 kHz, and the quantity N of blank symbols is 1; or the subcarrier spacing of the first slot is 60 kHz, and the quantity N of blank symbols is 2.

According to a third aspect, a method for configuring a sidelink resource is provided, which may be applied to a first terminal device, or may be applied to a component (such as a chip, a chip system, or a processor) in the first terminal device, The method includes: receiving first sidelink control information SCI, where the first SCI includes first indication information, the first indication information indicates positions of a first slot and/or a second slot in a plurality of slots, the first slot is for receiving first sidelink information, and the second slot is for sending second sidelink information; determining the first feedback slot based on the position of the first slot in the plurality of slots and a first periodicity, and determining the second feedback slot based on the position of the second slot in the plurality of slots and a second periodicity, where the first periodicity is a periodicity of the first feedback slot in the first slot, the first feedback slot includes a first physical sidelink feedback channel PSFCH, the first PSFCH is configured to send first hybrid automatic repeat request HARQ information, the second periodicity is a periodicity of the second feedback slot in the second slot, the second feedback slot includes a second physical sidelink feedback channel PSFCH, and the second PSFCH is configured to receive second HARQ information; and receiving the first sidelink information in the first slot, or sending the second sidelink information in the second slot.

Because the first terminal device is configured to receive the first SCI, the first terminal device may be understood as a receive end device in the method.

In the foregoing technical solution, the first terminal device can identify, by obtaining the positions of the first slot and/or the second slot in the plurality of slots indicated by the first indication information and about information about the first periodicity and/or the second periodicity, slots in which data is sent and/or received and slots in which feedback information is sent and/or received.

For example, a COT frame structure preempted by a transmit end in an unlicensed frequency band is TTTTRRRRTT, and each T or R corresponds to one slot (assuming that the COT corresponds to a slot #0 to a slot #9). The transmit end sends sidelink information in a slot corresponding to T, the receive end receives the sidelink information in a slot corresponding to R, and a slot configured as R in the COT may be shared with the receive end for sending the sidelink information. To implement flexible HARQ feedback in the PSFCH, the receive end receives COT frame structure information carried in the SCI from the transmit end (that is, the positions of the first slot and/or the second slot in the plurality of slots), a periodicity of a slot in which a PSFCH exists in a slot whose COT is T (that is, the first periodicity), and/or a periodicity of a slot in which a PSFCH exists in a slot whose COT is R (that is, the second periodicity). For example, if the first periodicity is 3, the receive end may determine that a slot including a PSFCH exists every three slots starting from the slot #0 for all slots that are T in the COT. That is, the slots in which the PSFCH exists are the slot #2 and the slot #9. If the second periodicity is 2, the transmit end may determine that a slot including a PSFCH exists every two slots starting from the slot #4 for all slots that are R in the COT. That is, the slots in which the PSFCH exists are the slot #5 and the slot #7.

In an embodiment, the first periodicity or the second periodicity is carried in the first SCI or higher layer signaling.

According to a fourth aspect, a method for configuring a sidelink resource is provided, which may be applied to a second terminal device, or may be applied to a component (such as a chip, a chip system, or a processor) in a second terminal device, The method includes: sending first sidelink control information SCI, where the first SCI includes first indication information, the first indication information indicates positions of a first slot and/or a second slot in a plurality of slots, the first slot is for sending first sidelink information, and the second slot is for receiving second sidelink information; determining the first feedback slot based on the position of the first slot in the plurality of slots and a first periodicity, and determining the second feedback slot based on the position of the second slot in the plurality of slots and a second periodicity, where the first periodicity is a periodicity of the first feedback slot in the first slot, the first feedback slot includes a first physical sidelink feedback channel PSFCH, the first PSFCH is configured to receive first hybrid automatic repeat request HARQ information, the second periodicity is a periodicity of the second feedback slot in the second slot, the second feedback slot includes a second PSFCH, and the second PSFCH is configured to send second HARQ information; and sending the first sidelink information in the first slot, or receiving the second sidelink information in the second slot.

Because the second terminal device is configured to send the first SCI, the second terminal device may be understood as a transmit end device in the method.

For beneficial effects of the fourth aspect, refer to the description in the third aspect. Details are not described herein again.

In an embodiment, the first periodicity or the second periodicity is carried in the first SCI or higher layer signaling.

According to a fifth aspect, a method for configuring a sidelink resource is provided, which may be applied to a first terminal device, or may be applied to a component (such as a chip, a chip system, or a processor) in a first terminal device, The method includes: The first terminal device receives first sidelink control information SCI in a first slot. The first sidelink control information SCI includes first indication information and a first periodicity. The first indication information indicates a direction of each slot in a channel occupancy time COT obtained by a second terminal device, the direction of each slot is a direction of corresponding sending or receiving sidelink information when the second terminal device uses the slot. The first periodicity is a periodicity of a slot in which a PSFCH exists in slots for the second terminal device to send sidelink information in the COT. The first slot is a slot in the slots for the second terminal device to send sidelink information. The first terminal device receives first sidelink information from the second terminal device in the COT. The first terminal device determines a position of a second slot based on position information corresponding to a slot for the second terminal device to send a sidelink signal in the COT and the first periodicity. The second slot is a slot in which a PSFCH exists in the slots for the second terminal device to send sidelink information in the COT. The first terminal device sends first HARQ information to the second terminal device on a corresponding PSFCH of the second slot, where the first HARQ information includes a demodulation result of the first sidelink information.

In an embodiment, the first sidelink control information SCI further includes a first minimum time interval, and that the first terminal device sends first HARQ information to the second terminal device on a corresponding PSFCH of the second slot includes: The first terminal device sends the first HARQ information to the second terminal device on the corresponding PSFCH of the first slot based on the first minimum time interval, where the first minimum time interval is a minimum time interval at which the first terminal device performs HARQ feedback on a first sidelink.

In an embodiment, the first sidelink control information SCI further includes a second periodicity, where the second periodicity is a periodicity of a slot in which a PSFCH exists in slots for the second terminal device to receive a sidelink signal in the COT. The method further includes: The first terminal device determines a position of a third slot based on position information corresponding to a slot for the second terminal device to receive sidelink information in the COT and the second periodicity, where the third slot is a slot in which a PSFCH exists in the slots for the second terminal device to receive sidelink information in the COT. The first terminal device sends second sidelink information to the second terminal device in the COT. The first terminal device obtains second HARQ information from the second terminal device on the PSFCH of the third slot, where the second HARQ information includes a demodulation result of the second sidelink information.

According to a sixth aspect, a method for configuring a sidelink resource is provided, which may be applied to a second terminal device, or may be applied to a component (such as a chip, a chip system, or a processor) in a second terminal device, The method includes: The second terminal device sends first sidelink control information SCI in a first slot. The first sidelink control information SCI includes first indication information and a first periodicity. The first indication information indicates a direction of each slot in a COT obtained by the second terminal device. The direction of each slot is a corresponding direction for sending or receiving sidelink information when the second terminal device uses the slot. The first periodicity is a periodicity of a slot in which a PSFCH exists in slots for the second terminal device to send sidelink information in the COT. The first slot is a slot in the slots for the second terminal device to send sidelink information. The second terminal device sends first sidelink information to a first terminal device in the COT. The second terminal device determines a position of a second slot based on position information corresponding to a slot for the second terminal device to send sidelink information in the COT and the first periodicity. The second slot is a slot in which a PSFCH exists in the slots for the second terminal device to send sidelink information in the COT. The second terminal device obtains first HARQ information from the first terminal device on a corresponding PSFCH of the second slot, where the first HARQ information includes a demodulation result of the first sidelink.

In an embodiment, the first sidelink control information SCI further includes a second periodicity, where the second periodicity is a periodicity of a slot in which a PSFCH exists in slots for the second terminal device to receive sidelink information in the COT. The method further includes: The second terminal device determines a position of a third slot based on position information corresponding to a slot for the second terminal device to receive sidelink information in the COT and the second periodicity, where the third slot is a slot in which a PSFCH exists in the slots for the second terminal device to receive sidelink information in the COT. The second terminal device receives second sidelink information from the first terminal device in the COT. The second terminal device sends second HARQ information to the first terminal device on corresponding PSFCH of the third slot, where the second HARQ information includes a demodulation result of the second sidelink.

In an embodiment, the first sidelink control information SCI further includes a second minimum time interval, and that the second terminal device sends second HARQ information to the first terminal device on corresponding PSFCH of the third slot includes: The second terminal device sends the second HARQ information to the first terminal device on the corresponding PSFCH of the third slot based on the second minimum time interval, where the second minimum time interval is a minimum time interval at which the second terminal device performs HARQ feedback on a second sidelink.

According to a seventh aspect, this application provides a communication apparatus. The communication apparatus has a function of implementing the method in the first aspect or any possible implementation of the first aspect, a function of implementing the method in the third aspect or any possible implementation of the third aspect, or a function of implementing the method in the fifth aspect or any possible implementation of the fifth aspect. The function may be implemented by hardware, or may be implemented by executing corresponding software by hardware. The hardware or the software includes one or more units corresponding to the foregoing function.

In an example, the communication apparatus may be a first terminal device.

In another example, the communication apparatus may be a component (for example, a chip or an integrated circuit) installed in a first terminal device.

According to an eighth aspect, this application provides a communication apparatus. The communication apparatus has a function of implementing the method in the second aspect or any possible implementation of the second aspect, a function of implementing the method in the fourth aspect or any possible implementation of the fourth aspect, or a function of implementing the method in the sixth aspect or any possible implementation of the sixth aspect. The function may be implemented by hardware, or may be implemented by executing corresponding software by hardware. The hardware or the software includes one or more units corresponding to the foregoing function.

In an example, the communication apparatus may be a second terminal device.

In another example, the communication apparatus may be a component (for example, a chip or an integrated circuit) installed in a second terminal device.

According to a ninth aspect, this application provides a communication device, including at least one processor. The at least one processor is coupled to at least one memory, the at least one memory is configured to store a computer program or instructions, and the at least one processor is configured to invoke and run the computer program or instructions from the at least one memory, so that the communication device performs the method in the first aspect or any possible implementation of the first aspect, performs the method in the third aspect or any possible implementation of the third aspect, or performs the method in the fifth aspect or any possible implementation of the fifth aspect.

In an example, the communication apparatus may be a first terminal device.

In another example, the communication apparatus may be a component (for example, a chip or an integrated circuit) installed in a first terminal device.

According to a tenth aspect, this application provides a communication device, including at least one processor. The at least one processor is coupled to at least one memory, the at least one memory is configured to store a computer program or instructions, and the at least one processor is configured to invoke and run the computer program or instructions from the at least one memory, so that the communication device performs the method in the second aspect or any possible implementation of the second aspect, performs the method in the fourth aspect or any possible implementation of the fourth aspect, or performs the method in the sixth aspect or any possible implementation of the sixth aspect.

In an example, the communication apparatus may be a second terminal device.

In another example, the communication apparatus may be a component (for example, a chip or an integrated circuit) installed in a second terminal device.

According to an eleventh aspect, a processor is provided, and includes: an input circuit, an output circuit, and a processing circuit. The processing circuit is configured to receive a signal through the input circuit, and transmit a signal through the output circuit, so that the method in the first aspect or any possible implementation of the first aspect is implemented, or the method in the third aspect or any possible implementation of the third aspect is implemented, or the method in the fifth aspect or any possible implementation of the fifth aspect is implemented.

During implementation, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver. A signal output by the output circuit may be output to, for example, but not limited to, a transmitter and transmitted by the transmitter. The input circuit and the output circuit may be a same circuit, where the circuit is used as the input circuit and the output circuit at different moments. Implementations of the processor and the various circuits are not limited in embodiments of this application.

According to a twelfth aspect, a processor is provided, and includes: an input circuit, an output circuit, and a processing circuit. The processing circuit is configured to receive a signal through the input circuit, and transmit a signal through the output circuit, so that the method in the second aspect or any possible implementation of the second aspect is implemented, or the method in the fourth aspect or any possible implementation of the fourth aspect is implemented, or the method in the sixth aspect or any possible implementation of the sixth aspect is implemented.

During implementation, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver. A signal output by the output circuit may be output to, for example, but not limited to, a transmitter and transmitted by the transmitter. The input circuit and the output circuit may be a same circuit, where the circuit is used as the input circuit and the output circuit at different moments. Implementations of the processor and the various circuits are not limited in embodiments of this application.

According to a thirteenth aspect, this application provides a computer-readable storage medium. The computer-readable storage medium stores computer instructions, and when the computer instructions are run on a computer, the method in the first aspect or any possible implementation of the first aspect is performed, the method in the third aspect or any possible implementation of the third aspect is performed, or the method in the fifth aspect or any possible implementation of the fifth aspect is performed.

According to a fourteenth aspect, this application provides a computer-readable storage medium. The computer-readable storage medium stores computer instructions, and when the computer instructions are run on a computer, the method in the second aspect or any possible implementation of the second aspect is performed, the method in the fourth aspect or any possible implementation of the fourth aspect is performed, or the method in the sixth aspect or any possible implementation of the sixth aspect is performed.

According to a fifteenth aspect, this application provides a computer program product. The computer program product includes computer program code, and when the computer program code is run on a computer, the method in the first aspect or any possible implementation of the first aspect is performed, the method in the third aspect or any possible implementation of the third aspect is performed, or the method in the fifth aspect or any possible implementation of the fifth aspect is performed.

According to a sixteenth aspect, this application provides a computer program product. The computer program product includes computer program code, and when the computer program code is run on a computer, the method in the second aspect or any possible implementation of the second aspect is performed, the method in the fourth aspect or any possible implementation of the fourth aspect is performed, or the method in the sixth aspect or any possible implementation of the sixth aspect is performed.

According to a seventeenth aspect, this application provides a chip, including a processor and a communication interface. The communication interface is configured to receive a signal, and transmit the signal to the processor, and the processor processes the signal, so that the method in the first aspect or any possible implementation of the first aspect is performed, or so that the method in the third aspect or any possible implementation of the third aspect is performed, or so that the method in the fifth aspect or any possible implementation of the fifth aspect is performed.

According to an eighteenth aspect, this application provides a chip, including a processor and a communication interface. The communication interface is configured to receive a signal, and transmit the signal to the processor, and the processor processes the signal, so that the method in the second aspect or any possible implementation of the second aspect is performed, or so that the method in the fourth aspect or any possible implementation of the fourth aspect is performed, or so that the method in the sixth aspect or any possible implementation of the sixth aspect is performed.

According to a nineteenth aspect, this application provides a communication system, including the communication device according to the ninth aspect and the communication device according to the tenth aspect.

DESCRIPTION OF EMBODIMENTS

The following describes technical solutions of this application with reference to the accompanying drawings.

Technical solutions provided in this application may be applied to various communication systems, for example, long term evolution (LTE) systems, worldwide interoperability for microwave access (WiMAX) communication systems, 5th generation (5G) mobile communication systems, or new radio access technology (NR). The 5G mobile communication system may include non-standalone networking (NSA) and/or standalone networking (SA).

The technical solutions provided in this application may further be applied to a future communication system, for example, a sixth generation mobile communication system. This is not limited in this application.

The technical solutions provided in this application may further be applied to machine type communication (MTC), a device-to-device (device-to-device, D2D) network, a machine to machine (M2M) network, and an Internet of Things (IoT) network or other networks. The IoT network may include, for example, the Internet of Vehicles. Communication manners in an Internet of Vehicles system are collectively referred to as vehicle to other devices (vehicle to X, V2X, X can stand for anything). For example, the V2X may include: vehicle to vehicle (V2V) communication, vehicle to infrastructure (V2I) communication, vehicle to pedestrian communication (V2P), vehicle to network (V2N) communication, or the like. A V2X communication system is a sidelink (SL) transmission technology based on D2D communication.

Figure 1:
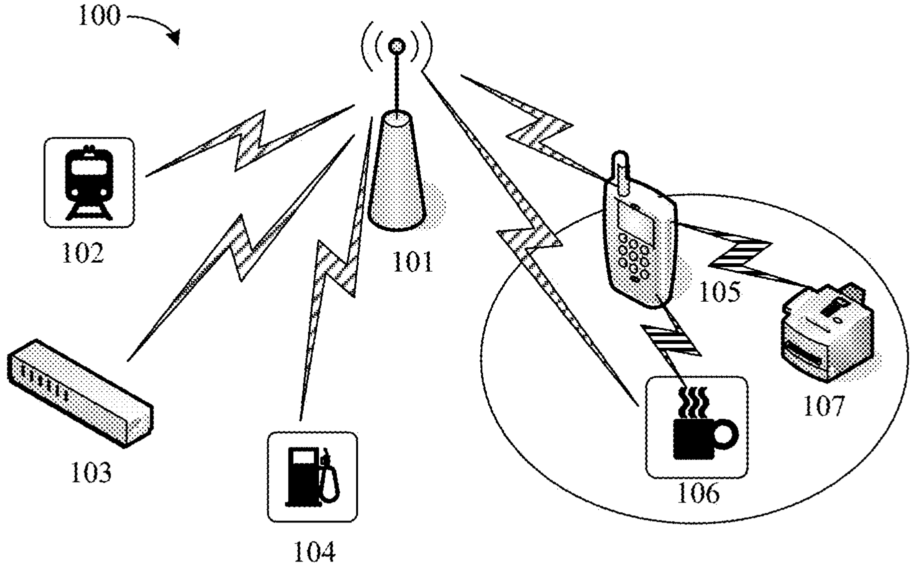
FIG. 1 is a diagram of a communication system 100 applicable to an embodiment of this application.

Refer to FIG. 1. FIG. 1 is a schematic diagram of a communication system 100 applicable to an embodiment of this application. As shown in FIG. 1, the communication system 100 may include at least one network device, such as a network device 101 shown in FIG. 1. The communication system 100 may further include at least one terminal device, such as terminal devices 102 to 107 shown in FIG. 1. The terminal devices 102 to 107 may be mobile or fastened. The network device 101 and one or more of the terminal devices 102 to 107 may communicate with each other through a radio link. Each network device may provide communication coverage for a geographical area, and may communicate with a terminal device located in a coverage area. For example, the network device may send configuration information to the terminal device, and the terminal device may send uplink data to the network device based on the configuration information. For another example, the network device may send downlink data to the terminal device. Therefore, the network device 101 and the terminal devices 102 to 107 in FIG. 1 form a communication system.

In some embodiments, terminal devices can directly communicate with each other. For example, direct communication between terminal devices may be implemented by using a D2D technology or the like. As shown in the figure, the terminal devices 105 and 106 and the terminal devices 105 and 107 may directly communicate with each other by using the D2D technology. The terminal device 106 and the terminal device 107 may separately or simultaneously communicate with the terminal device 105.

Alternatively, the terminal devices 105 to 107 may separately communicate with the network device 101. For example, the terminal devices 105 to 107 may directly communicate with the network device 101, for example, the terminal device 105 and the terminal device 106 in the figure may directly communicate with the network device 101. Alternatively, the terminal devices 105 to 107 may indirectly communicate with the network device 101, for example, the terminal device 107 in the figure communicates with the network device 101 via the terminal device 105.

It should be understood that FIG. 1 shows an example of communication links between one network device and a plurality of terminal devices, and between communication devices. In some embodiments, the communication system 100 may include a plurality of network devices, and coverage of each network device may include another quantity of terminal devices, for example, more or fewer terminal devices. This is not limited in this application.

A plurality of antennas may be configured for each of the foregoing communication devices, such as the network device 101 and the terminal devices 102 to 107 in FIG. 1. The plurality of antennas may include at least one transmit antenna configured to transmit a signal and at least one receive antenna configured to receive a signal. In addition, each communication device further includes a transmitter chain and a receiver chain. A person of ordinary skill in the art may understand that each of the transmitter chain and the receiver chain may include a plurality of components related to signal transmission and reception (for example, a processor, a modulator, a multiplexer, a demodulator, a demultiplexer, or an antenna). Therefore, the network device and the terminal device may communicate with each other through a multi-antenna technology.

In embodiments of this application, a network device may be any device having a wireless transceiver function. The device includes, but is not limited to: an evolved NodeB (eNB), a radio network controller (RNC), a NodeB (NB), a base station controller (BSC), a base transceiver station (BTS), a home base station (for example, a home evolved NodeB, or a home NodeB, (HNB), a baseband unit (BBU), an access point (AP), a wireless relay node, a wireless backhaul node, a transmission point (TP), or a transmission and reception point (TRP), or the like in a wireless fidelity (Wi-Fi) system, or may be a gNB or a transmission point (TRP or TP) in a 5G, for example, NR, system, one or a group (including a plurality of antenna panels) of antenna panels of a base station in a 5G system, or may be a network node that forms a gNB or a transmission point, for example, a BBU, a distributed unit (DU), or the like.

In some deployments, the gNB may include a central unit (CU) and a DU. The gNB may alternatively include an active antenna unit (AAU). The CU implements some functions of the gNB, and the DU implements some functions of the gNB. For example, the CU is responsible for processing a non-real-time protocol and service, and implements radio resource control (RRC) and functions of a packet data convergence protocol (PDCP) layer. The DU is responsible for processing a physical layer protocol and a real-time service, and implementing functions of a radio link control (RLC) layer, a medium access control (MAC) layer, and a physical (PHY) layer. The AAU performs some physical layer processing functions, radio frequency processing, and functions related to active antennas. Because information at an RRC layer is finally changed into information at the PHY layer, or is changed from information at the PHY layer, in this architecture, higher layer signaling such as RRC layer signaling may alternatively be considered to be sent by the DU or sent by a DU+AAU. It may be understood that the network device may be a device including one or more of a CU node, a DU node, and an AAU node. In addition, the CU may be classified into a network device in an access network (RAN), or the CU may be classified into a network device in a core network (CN). This is not limited in this application.

The network device provides a service for a cell, and the terminal device communicates with the cell through a transmission resource allocated by the network device (for example, a frequency domain resource, or a spectrum resource). The cell may belong to a macro base station (for example, a macro eNB or a macro gNB), or may belong to a base station corresponding to a small cell. The small cell herein may include: a metro cell (metro cell), a micro cell (micro cell), a pico cell, a femto cell, and the like. These small cells have characteristics of small coverage and low transmit power, and are applicable to providing a high-speed data transmission service.

In embodiments of this application, the terminal device may also be referred to as user equipment (UE), an access terminal, a subscriber unit, a subscriber station, a mobile station, a mobile console, a remote station, a remote terminal, a mobile device, a user terminal, a terminal, a wireless communication device, a user agent, or a user apparatus.

The terminal device may be a device that provides voice/data connectivity for a user, for example, a handheld device or an in-vehicle device with a wireless connection function. Currently, examples of some terminals may be: a mobile phone, a tablet computer (pad), a computer with a wireless transceiver function (such as a notebook computer or a palmtop computer), a mobile Internet device (MID), a virtual reality (VR) device, an augmented reality (AR) device, a wireless terminal in industrial control, a wireless terminal in self-driving, a wireless terminal in remote medical, a wireless terminal in smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device or a computing device with a wireless communication function, or another processing device, an in-vehicle device, and a wearable device connected to wireless modems, a terminal device in a 5G network, a terminal device in a future evolved public land mobile network (PLMN), or the like.

The wearable device may also be referred to as a wearable intelligent device, and is a generic term for wearable devices such as glasses, gloves, watches, clothes, and shoes that are developed by applying wearable technologies to intelligent designs of daily wear. The wearable device is a portable device that is directly worn on the body or integrated into clothes or accessories of a user. The wearable device is not merely a hardware device, but implements powerful functions through software support, data exchange, and cloud interaction. In a broad sense, the wearable intelligent device includes devices that have full functions and a large size, and can implement complete or partial functions without a smartphone, for example: smartwatches or smart glasses, and devices such as various smart bands and smart jewelry for physical sign monitoring which focus only on a type of application function, and need to be used with other devices such as smartphones.

In addition, the terminal device may alternatively be a terminal device in an IoT system. IoT is an important part of future information technology development. The main technical feature of the IoT is to connect articles to networks through communication technologies, thereby implementing an intelligent network of human-machine interconnection and things interconnection. The IoT technology may implement massive connections, in-depth coverage, and terminal power saving by using, for example, a narrowband (NB) technology. In addition, the terminal device may alternatively include sensors such as an intelligent printer, a train detector, and a gas station, and main functions include: collecting data (which is a function of some terminal devices), receiving control information and downlink data of a network device, sending an electromagnetic wave, and transmitting uplink data to the network device.

The terminal device may alternatively be a road side communication unit (RSU). The RSU is a facility deployed on the roadside to assist communication in a vehicle-mounted delay-tolerant networking, which is directly connected to a backbone network and can perform wireless communication with vehicles. Compared with vehicles in the vehicle-mounted delay-tolerant networking, the RSU has a better communication capability, larger coverage and a larger transmission speed, and can communicate with a plurality of vehicles at the same time. In addition, the RSU has a large storage space, to store information and improve the communication probability. Therefore, by deploying a related RSU in a road traffic system, an existing vehicle-mounted Internet access problem can be effectively resolved, and a communication opportunity between vehicles can be greatly increased. A message is cached by the RSU, implementing efficient message transmission between vehicles.

During actual deployment, the RSU may be a terminal device, or the RSU may be a network device.

In some embodiments, the wireless communication system 100 may alternatively include another network entity such as a network controller and a mobility management entity. This is not limited in embodiments of this application.

To facilitate understanding of embodiments of this application, several terms in this application are briefly described first.

(1) Listen before talk (LBT): In a communication system deployed based on an unlicensed spectrum, each node determines a busy or idle state based on a value of a receive power in an unlicensed frequency band. If the receive power is less than a threshold, it is considered that there is no interference source on the unlicensed frequency band and the unlicensed frequency band is in the idle state. Only when the frequency band is idle and is not occupied by another network device or terminal device, the network device or terminal device can use (preempt) the frequency band (channel), and then send information and data. This mechanism of listening before sending is referred to as LBT, and the mechanism can avoid a conflict when nodes use an unlicensed spectrum resource.

(2) Channel occupancy time (COT): The COT refers to a total time in which the network device or the terminal device and any other terminal device or network device that shares a channel perform transmission on the channel after the network device or the terminal device performs a corresponding channel access process.

(3) COT sharing: The COT sharing is a process in which an initial device that preempts the COT may jointly occupy the channel with another device that interacts with the initial device. For example, in a case of non-COT sharing, the initial device that preempts the COT is configured to send data to another device in the COT after preempting the channel, and does not receive data sent by another device in the COT. However, in a case of COT sharing, in a part of a time periodicity of the COT, the initial device may send data to another device, and in another time periodicity of the COT, another device that receives the data may send data to the initial device by using the COT. Generally, a device that does not receive the data sent by the initial device cannot send data to the initial device by using the COT.

Figure 2:
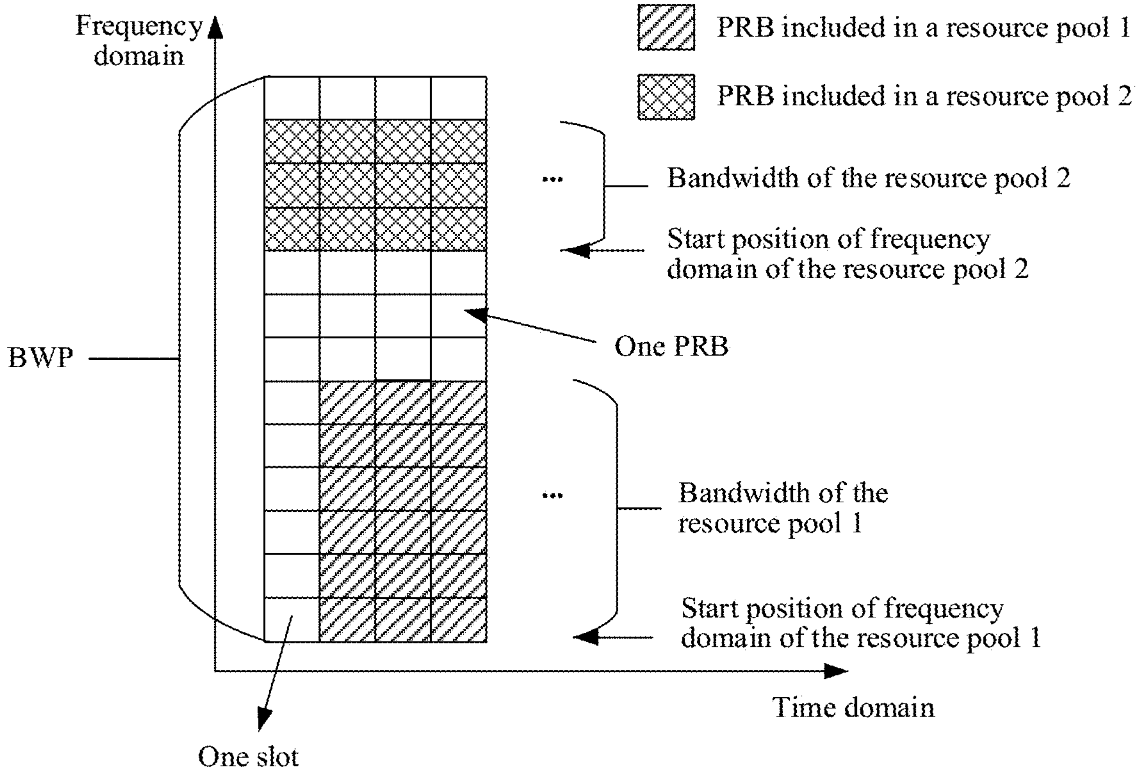
FIG. 2 is a diagram of a configuration manner of a resource pool in NR-V2X.

FIG. 2 is a schematic diagram of a configuration manner of a resource pool in NR-V2X according to an embodiment of this application. Refer to FIG. 2. In a bandwidth part (BWP) in which a sidelink configured for D2D transmission is located, a frequency domain resource for sidelink transmission may include several consecutive physical resource blocks (PRBs). FIG. 2 is used as an example. Any grid in FIG. 2 represents one PRB, and a length of any grid in FIG. 2 in time domain represents one slot. Some grids in FIG. 2 (that is, PRBs occupied by shaded parts) together form a frequency domain resource for D2D transmission. In the BWP shown in FIG. 2, more than one resource pool may be configured, for example: a resource pool 1 and a resource pool 2. Each resource pool corresponds to a sending direction or a receiving direction, indicating that the resource pool is only for sending sidelink information or only for receiving sidelink information. A frequency domain position of each resource pool is determined by two parameters: a start position of frequency domain and a bandwidth. The bandwidth is determined by two parameters: subchannelsize and numsubchannel. No frequency resource for sidelink transmission in the BWP can be used for cellular network data transmission. In addition, slots for D2D transmission are distributed in an uplink subframe. In time domain, a bitmap (bit-map) manner may be used to indicate which uplink subframe can be used for sidelink transmission. A bit (bit) 1 indicates that the uplink subframe can be used for sidelink transmission, and a bit 0 indicates that the uplink subframe cannot be used for sidelink transmission. Other subframes such as a downlink subframe, for example, subframes for transmitting system synchronization blocks (System Synchronization/Physical Broadcast Channel, SS/PBCH), cannot be used for sidelink transmission.

Figure 3:
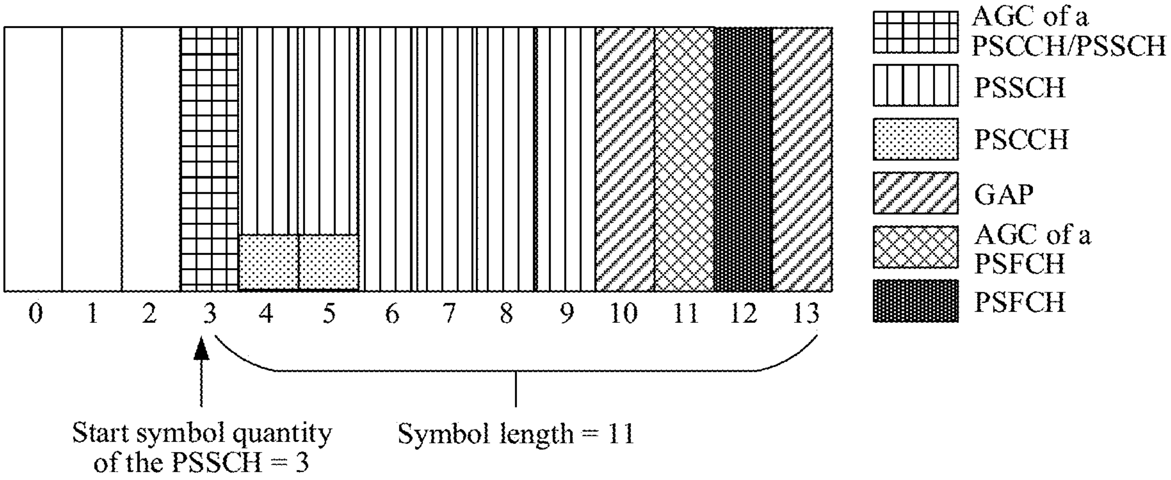
FIG. 3 is a diagram of structural composition of a sidelink slot according to an embodiment of this application.

FIG. 3 is a schematic diagram of structural composition of a sidelink slot according to an embodiment of this application. Refer to FIG. 3. Each grid corresponding to sequence numbers 0 to 13 represents one symbol, and a symbol 0 to a symbol 13 form one slot. The slot may be a slot for sidelink transmission, or may be referred to as a sidelink slot. In some embodiments, distribution of channels in a sidelink slot is shown in FIG. 3. A physical sidelink share channel (physical sidelink share channel, PSSCH) is distributed in the symbol 4 to the symbol 9, a physical sidelink control channel (PSCCH) is distributed in the symbol 4 and the symbol 5, a physical sidelink feedback channel (PSFCH) is distributed in the symbol 12, automatic gain control (AGC) of a PSCCH/PSSCH is distributed in a slot 3, ACG of the PSFCH is distributed in the symbol 11, and a gap GAP is distributed on the symbol 10 and the symbol 13. The base station configures, for the terminal device by using RRC signaling, a start symbol quantity startSLsymbols of the PSSCH and a symbol length lengthSLsymbols occupied by the PSSCH in one slot. The PSSCH is followed by the PSFCH at an interval of two symbols. The two symbols are GAP and AGC, which are for transmit/receive conversion and automatic gain control respectively. The PSFCH is followed by a symbol of GAP, which is also for transmit/receive conversion. As shown in FIG. 3, a start symbol quantity startSLsymbols of the PSSCH is 3, and a symbol length lengthSLsymbols occupied by the PSSCH in one slot is 11.

It should be understood that FIG. 3 is merely an example of a slot structure in which a sidelink slot includes a PSFCH, and some sidelink slot structures may not include a PSFCH. Regardless of whether a slot includes a PSFCH, a last symbol of the slot may be a GAP, and the GAP may also be referred to as a blank symbol.

FIG. 2 and FIG. 3 respectively describe a resource configuration manner of a D2D technology in a licensed frequency band and a composition structure of a sidelink slot. Because a resource pool configured in current NR-V2X is not flexible enough, the resource pool is not applicable to a large-packet aperiodic service, for example, an AR/VR data transmission scenario. In addition, a fixed resource configuration manner of a resource pool of a D2D technology in a current licensed frequency band is also inapplicable to an unlicensed frequency band.

In view of this, this application provides a method for configuring a sidelink resource, to implement flexible D2D resource configuration.

Figure 4:
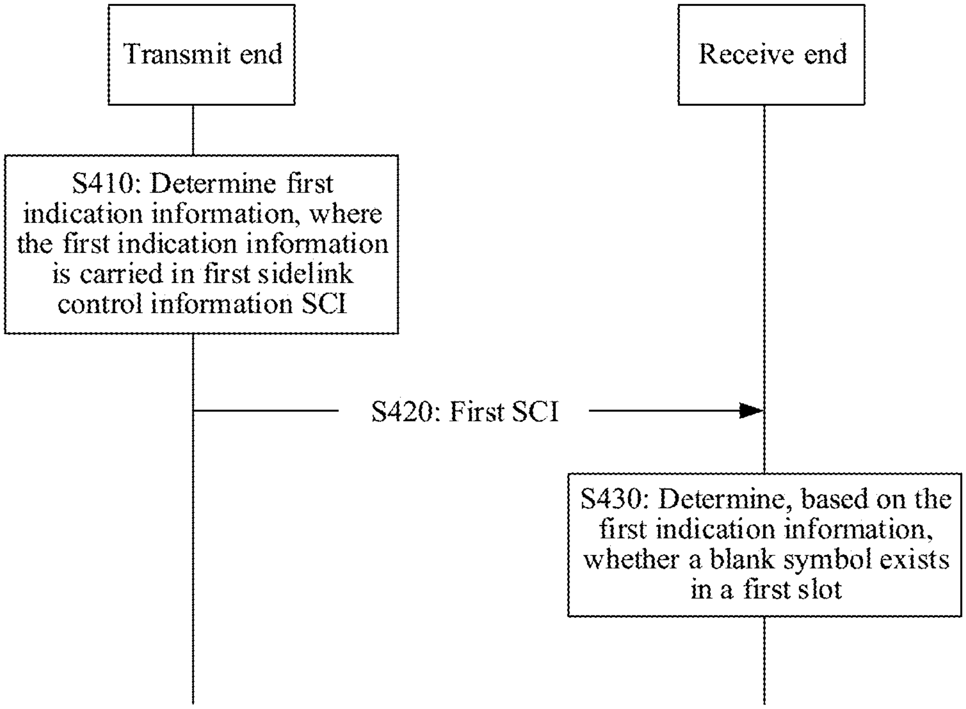
FIG. 4 is a flowchart of a method for configuring a sidelink resource according to this application.

Refer to FIG. 4. FIG. 4 is a schematic flowchart of a method for configuring a sidelink resource according to this application.

S410: A transmit end determines first indication information. The first indication information is carried in first sidelink control information (SCI). The first SCI includes the first indication information, and the first indication information indicates whether a blank symbol exists in a first slot. The blank symbol is located in last N symbols of the first slot, where N is a natural number.

It may also be understood that the first indication information indicates whether the last N symbols of the first slot are blank symbols, where N is a natural number.

It may also be understood that the first indication information indicates whether last one or more symbols of the first slot are blank symbols. The foregoing three descriptions about first indication have the same meaning in this application.

It should be noted that the blank symbol means that a terminal device cannot send on the symbol, but does not mean a limitation that the terminal device cannot receive on the symbol. Because the symbol cannot be used for sending, correspondingly, even if the terminal device can perform receiving, the terminal device cannot receive any information.

In some embodiments, the first indication information is 1-bit information, and the first indication information indicates whether the last one or more symbols of the first slot are blank symbols. For example, in this implementation, that the first indication information is 0 indicates that no blank symbol is reserved in the first slot, and that the first indication information is 1 indicates that the last one or more symbols of the first slot are blank symbols. The blank symbol may be understood as a GAP symbol in FIG. 2 or FIG. 3.

In some embodiments, the first indication information is multi-bit information, and the first indication information indicates that last N symbols of the first slot are blank symbols, where N is an integer greater than or equal to 0. It should be understood that, because the first indication information is multi-bit information, the first indication information may directly indicate a quantity of reserved blank symbols. For example, if the first indication information is 2-bit information, that the first indication information is 00 indicates that no blank symbol is reserved in the first slot, that the first indication information is 10 indicates that last two symbols of the first slot are blank symbols, and that the first indication information is 11 indicates that last three symbols of the first slot are blank symbols.

In some embodiments, the transmit end determines a quantity of blank symbols that need to be reserved in the first slot.

In some embodiments, when N is not equal to 0, the transmit end determines, based on a subcarrier spacing of the first slot, the quantity of blank symbols that need to be reserved in the first slot.

Figure 5:
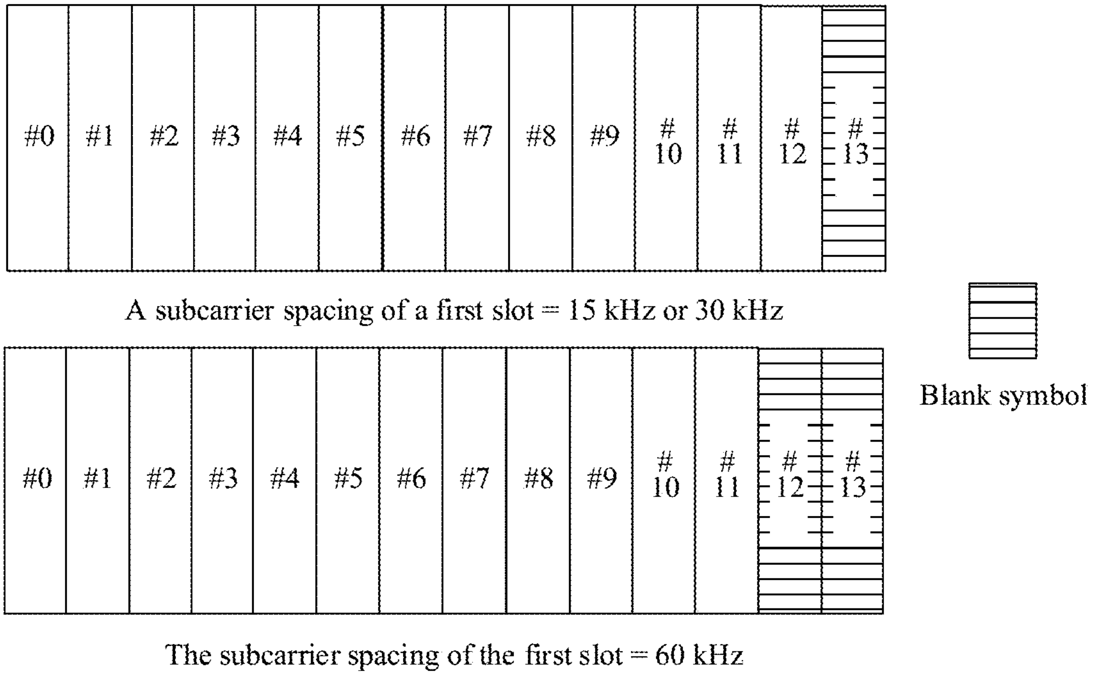
FIG. 5 is a diagram of a pattern of reserved blank symbols when a subcarrier spacing of a first slot is 15 kHz, 30 kHz, or 60 kHz according to an embodiment of this application.

For example, as shown in FIG. 5, FIG. 5 is a schematic diagram of a pattern of reserved blank symbols when a subcarrier spacing of a first slot is 15 kHz, 30 kHz, or 60 kHz according to an embodiment of this application. Grids corresponding to #0 to #13 in FIG. 5 are respectively corresponding to one symbol of the first slot. It can be learned that the subcarrier spacing of the first slot is 15 kHz or 30 kHz, and the transmit end reserves last one symbol (that is, a symbol corresponding to #13) in the first slot as a blank symbol. Alternatively, the subcarrier spacing of the first slot is 60 kHz, and the transmit end reserves last two symbols (that is, symbols corresponding to #12 and #13) in the first slot as blank symbols. In addition, the subcarrier spacing of the first slot is 120 kHz, and the transmit end reserves the last four symbols in the first slot as blank symbols. Alternatively, the subcarrier spacing of the first slot is 240 kHz, and the transmit end reserves the last eight symbols in the first slot as blank symbols.

It should be noted that the first slot is a sidelink slot in which no PSFCH exists. If a PSFCH exists in the sidelink slot, for slot composition of a sidelink, reference may be made to FIG. 11. Details are not described herein.

S420: The transmit end sends the first SCI in the first slot.

Correspondingly, a receive end receives the first SCI in the first slot.

S430: The receive end determines, based on the first indication information, whether a blank symbol exists in the first slot.

In some embodiments, the first indication information is 1-bit information. For example, that the first indication information is 0 indicates that the transmit end does not reserve a blank symbol in the first slot, and that the first indication information is 1 indicates that the transmit end reserves the last one or more symbols in the first slot as blank symbols. Alternatively, that a value of the first indication information is 1 indicates that the transmit end reserves no blank symbol in the first slot, and that a value of the first indication information is 0 indicates that the transmit end reserves the last one or more symbols in the first slot as blank symbols. The receive end may further determine, based on the subcarrier spacing of the first slot, a quantity of reserved blank symbols in the first slot. For a correspondence between the quantity of blank symbols and the subcarrier spacing, refer to the foregoing description. Details are not described herein again. The transmit end and the receive end in this embodiment of this application may be terminal devices.

The following describes the technical effects of the foregoing embodiments.

First, it can be learned from FIG. 3 that the last symbol of the sidelink slot is a GAP in which no signal is sent, and a function of the GAP is transmit/receive switching. It should be noted that a symbol distributed in a GAP in a sidelink slot may be understood as a blank symbol in this application. For a scenario in which some data packets are periodically sent or some small data packets are sent, existence of a blank symbol in each slot may not affect data sending. However, for a scenario in which large data is continuously sent, transmission period of some large data packets may occupy a plurality of consecutive slots. A GAP of a symbol is additionally reserved in each slot, causing a data packet not to be continuously sent due to the existence of a blank symbol, thereby causing waste of resources.

Second, when last several symbols of the first slot are blank symbols, the receive end may perform LBT or transmit/receive switching on the blank symbols of the first slot, to implement COT sharing in an unlicensed frequency band.

Therefore, when the first indication information indicates that the last one or more symbols of the first slot are non-blank symbols, the receive end may send a large data packet in the first slot, to continuously send periodic large data packets. When the first indication information indicates that the last one or more symbols in the first slot are blank symbols, the receive end may perform LBT or transmit/receive switching on the blank symbols of the first slot, to implement the COT sharing in an unlicensed frequency band.

The following uses a scenario in which the transmit end preempts the COT in an unlicensed frequency band as an example to describe the foregoing technical effects in detail.

Figure 6:
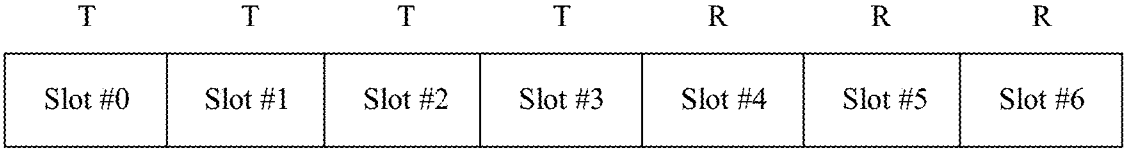
FIG. 6 is a diagram of a frame structure of a COT preempted by a transmit end according to an embodiment of this application.

FIG. 6 is a schematic diagram of a frame structure of a COT preempted by a transmit end according to an embodiment of this application. Refer to FIG. 6. Each small grid in FIG. 6 represents a slot. It can be learned that small grids corresponding to a slot #0 to a slot #6 represent a COT preempted by the transmit end, and a frame structure of the COT is TTTTRRR. Each T or R corresponds to one slot, and a correspondence is shown in FIG. 6. T indicates that the transmit end sends sidelink information in a corresponding slot, and R indicates that the transmit end receives sidelink information in a corresponding slot.

It should be understood that, the receive end may implement COT sharing through the frame structure of the COT, and a slot configured as R in the COT is a slot shared with the receive end for sending sidelink information. The transmit end determines a quantity of blank symbols that need to be reserved in the slot #0 to the slot #3 (that is, slots that are T in the COT).

To implement COT sharing by the receive end, the receive end needs 16 μs or 25 μs to perform LBT in the COT once. In this way, the transmit end needs to reserve a blank symbol for the transmit end in advance in the slot #3 for the receive end to perform LBT. In addition, to support different subcarrier spacings, the transmit end needs to reserve different quantities of blank symbols in the slot #3. For example, when the subcarrier spacing of the slot #3 is 15 kHz or 30 kHz, only last one blank symbol of the slot #3 needs to be reserved. When the subcarrier spacing is 60 kHz, last two blank symbols in the slot #3 need to be reserved.

In addition, the last one symbol in the slot #0 to the slot #2 in the COT may not be configured as a GAP for transmit/receive switching, that is, no blank symbol is reserved. The transmit end may send the sidelink information by using the last symbol in the slot #0 to the slot #2, to meet a requirement of the receive end for continuous sending.

(2) The transmit end determines, based on the quantity of blank symbols that need to be reserved in each of the slot #0 to the slot #3 (that is, the slots that are T in the COT), and sends first indication information corresponding to the slot #0 to the slot #3. The first indication information indicates whether the last one or more symbols of a corresponding slot are blank symbols, and first indication information corresponding to each slot is carried in SCI corresponding to the slot. It may be understood that, in this embodiment of this application, each slot may include one piece of first indication information, indicating whether the last one or more symbols in the slot are blank symbols.

For example, the transmit end sends SCI #0 in the slot #0, the SCI #0 carries indication information #0, and the indication information #0 indicates that the slot #0 reserves no blank symbol in the slot #0. It should be understood that, the indication information #0 herein represents first indication information corresponding to the slot #0. Information about SCI #1 and SCI #2 sent in the slot #1 and the slot #2 is similar to that of the SCI #0, and details are not described herein again. The transmit end sends SCI #3 in the slot #3, and the SCI #3 carries indication information #3. To enable the receive end to share resources corresponding to the slot #4 to the slot #6 in the COT, if the indication information #0 is 1 bit, the indication information #3 indicates that last several symbols in the slot #3 are blank symbols, and the receive end determines a quantity of blank symbols based on the subcarrier spacing. If the indication information #0 is multi-bit, for example, the subcarrier spacing is 60 kHz, the indication information #3 may alternatively directly indicate that last two symbols of the slot #3 are blank symbols.

In some embodiments, to reduce complexity of parsing the SCI, for whether to perform COT sharing, 1-bit information may be used in the SCI #0 to indicate enabling or disabling of a COT sharing function, for example, when a value of the 1-bit information is 0, it indicates that the COT sharing function is disabled, and when a value of the 1-bit information is 1, it indicates that the COT sharing function is enabled, and vice versa.

In some embodiments, the frame structure of the COT (for example, TTTTRRR) may be one of several common COT structures specified in a protocol in advance. When the COT sharing function is enabled, in some embodiments, the transmit end may include an index sequence number corresponding to the frame structure of the COT to the SCI #0. In some embodiments, the transmit end may directly include frame structure information of the COT to the SCI #0. It may be understood that the frame structure information of the COT is position information of T slots and R slots included in the COT. For example, 0 may be used for indicating that a corresponding slot is used by the transmit end to send sidelink information (that is, 0 represents T), and 1 may be used for indicating that a corresponding slot is used by the transmit end to receive sidelink information (that is, 1 represents R). In this way, frame structure information TTTTRRR of the COT may be represented as 00001111, and vice versa. When the COT sharing function is disabled, in some embodiments, a special COT frame structure may be specified in advance, and the special COT structure may indicate that the COT sharing function is currently disabled. The transmit end may include an index sequence number corresponding to the special frame structure of the COT to the SCI #0. In some embodiments, the transmit end may directly include special frame structure information of the COT to the SCI #0.

(3) The transmit end sends corresponding SCI #0 to SCI #3 in the slot #0 to the slot #3 (that is, slots that are T in the COT).

Correspondingly, the receive end receives the corresponding SCI #0 to SCI #3 in the slot #0 to the slot #3. The receive end determines, based on the indication information in the SCI #0 to the SCI #3, quantities of reserved blank symbols in the slot #0 to the slot #3, so that the receive end may perform LBT in the COT in the slot #3 in which the blank symbol is reserved, to implement COT sharing.

In the foregoing technical solution, if no blank symbol is reserved in the last one symbol of the slot #0 to the slot #2 in the COT, a requirement of the transmit end to continuously send a large data packet in the COT can be met. In addition, several blank symbols are reserved in the slot #3, and the receive end may perform LBT or transmit/receive switching on the blank symbols in the slot #3, to implement COT sharing.

Figure 7:
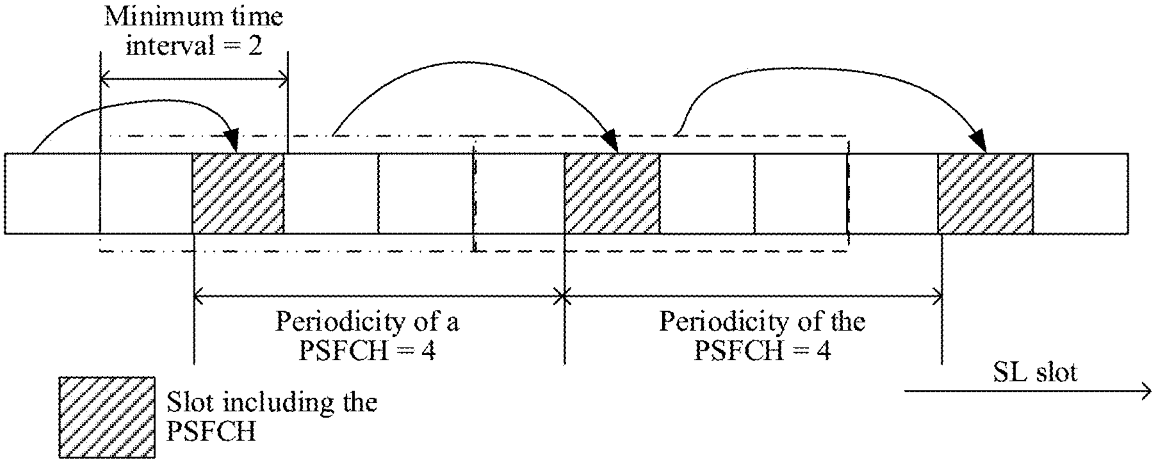
FIG. 7 is a diagram of a resource configuration manner of a PSFCH channel in NR-V2X.

A current configuration manner of a resource pool in NR-V2X does not support COT sharing performed by a terminal device in an unlicensed frequency band, and a current PSFCH configuration manner of NR-V2X is also inapplicable to an unlicensed frequency band. FIG. 7 is a diagram of a resource configuration manner of a PSFCH channel in NR-V2X. In FIG. 7, each small grid represents a slot. In the resource pool, the PSFCH for transmitting a feedback channel is periodically configured to the user through upper layer signaling (for example, RRC). A configuration parameter of a PSFCH channel periodicity is periodPSFCHresource. For example, periodPSFCHresource can be configured as zero slot, two slots, or four slots. That the parameter is configured as 0 indicates that no PSFCH exists in a current resource pool. That the parameter is configured as 2 indicates that PSFCHs exist at an interval of two slots. In FIG. 7, periodPSFCHresource=4 slots is used as an example for illustration. A transmit end user of a sidelink indicates whether a PSFCH exists in the current slot through the 1-bit information carried in the PSCCH. The PSFCH carries hybrid automatic repeat request (HARQ) information to feed back a demodulation result of the PSSCH, and a correspondence exists between the PSSCH and the PSFCH. A configuration parameter of a minimum time interval between the HARQ information and the PSSCH fed back in the PSFCH is MinTimeGapPSFCH. For example, MinTimeGapPSFCH may be configured as two slots or three slots. In FIG. 7, MinTimeGapPSFCH=2 slots is used as an example for illustration. That the parameter is configured as 2 indicates that HARQ information fed back in a current PSFCH may be a demodulation result of a PSSCH in a slot before two slots (including the slot in which the current PSFCH is located) before the slot in which the current PSFCH is located. For example, it can be learned from FIG. 7 that HARQ information corresponding to a PSSCH in a first slot is fed back in a first slot including a PSFCH. HARQ information corresponding to PSSCHs in four slots in a first dotted box is fed back in a second slot including a PSFCH. HARQ information corresponding to PSSCHs in four slots in a third dotted box is fed back in a third slot including a PSFCH, and so on.

In an unlicensed frequency band, the transmit end needs to perform LBT before accessing a channel. Due to uncertainty of the LBT, a start time of the COT may be at any time point in a slot for sidelink transmission. The PSFCH channel periodically configured in FIG. 7 may cause unnecessary PSFCHs to appear in the COT, so that a long-time (at least four symbols) GAP appears in the COT, and a transmit end user needs to preempt the channel again. Therefore, this configuration manner of a PSFCH channel is not applicable to an unlicensed frequency band.

In view of this, this application provides a method for configuring a sidelink resource, and a PSFCH channel can be flexibly configured in a shared frequency band to feed back HARQ information.

Figure 8:
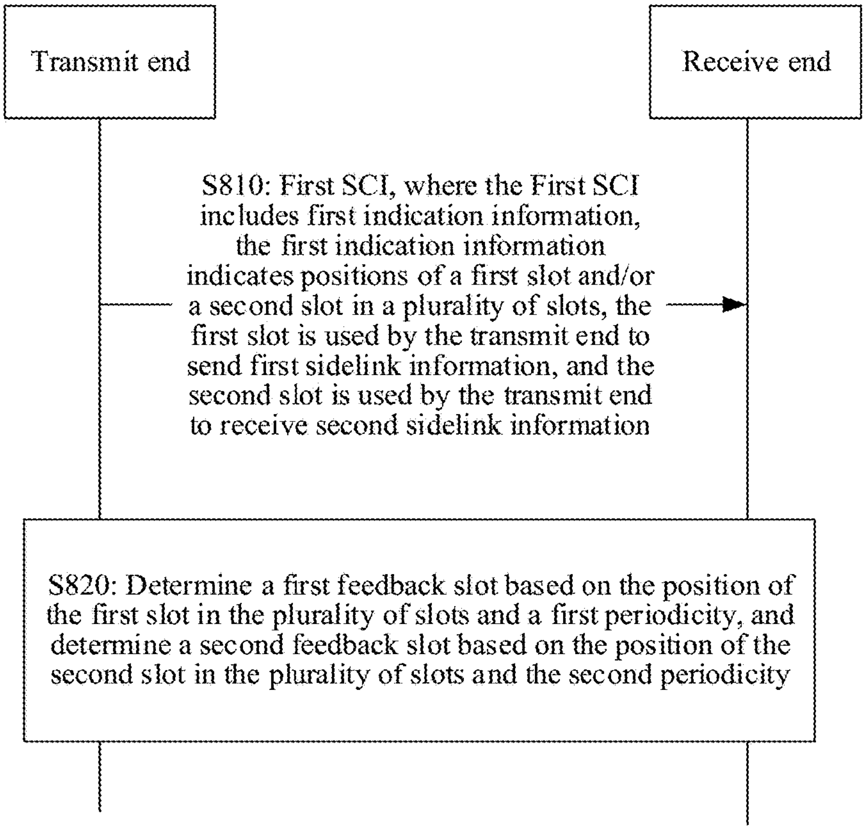
FIG. 8 is a flowchart of another method for configuring a sidelink resource according to this application.

Refer to FIG. 8. FIG. 8 is a schematic flowchart of another method for configuring a sidelink resource according to this application.

S810: A transmit end sends first SCI.

Correspondingly, a receive end receives the first SCI. The first SCI includes first indication information, the first indication information indicates positions of a first slot and/or a second slot in a plurality of slots, the first slot is used by the transmit end to send first sidelink information, and the second slot is used by the transmit end to receive second sidelink information.

S820: The transmit end or the receive end determines a first feedback slot based on the position of the first slot in the plurality of slots and a first periodicity, and determines a second feedback slot based on the position of the second slot in the plurality of slots and the second periodicity. The first periodicity is a periodicity of the first feedback slot in the first slot. The receive end may send first hybrid automatic repeat request HARQ information to the transmit end in the first feedback slot. The second periodicity is a periodicity of the second feedback slot in the second slot. The receive end may receive second HARQ information from the transmit end in the second feedback slot. It may be understood that the first feedback slot is a slot in which a PSFCH channel exists in the first slot. The second feedback slot is a slot in which a PSFCH channel exists in the second slot.

In an implementation, the first periodicity or the second periodicity may be carried in the first SCI.

In another implementation, the first periodicity or the second periodicity may be carried in higher layer signaling.

It should be understood that the first feedback slot includes a PSFCH channel in which the receive end can send the first HARQ information, and includes a PSSCH channel in which the transmit end can send the first sidelink information. The second feedback slot includes a PSFCH channel in which the receive end can receive the second HARQ information, and includes a PSSCH channel in which the transmit end can receive the second sidelink information.

It should be understood that a value corresponding to the first periodicity or the second periodicity may be 0 or a positive integer.

In some embodiments, when a value of the first periodicity is 0, it indicates that the first feedback slot does not exist in the first slot. Similarly, when a value of the second periodicity is 0, it indicates that the second feedback slot does not exist in the second slot.

In some embodiments, the first periodicity may not be configured. When the first periodicity is not configured, it is considered by default that the first feedback slot does not exist in the first slot. Similarly, the second periodicity may not be configured. When the second periodicity is not configured, it is also considered by default that the second feedback slot does not exist in the second slot. It should be understood that the PSFCH is for carrying HARQ information to feed back a demodulation result of sidelink information.

When the receive end needs to feed back the first HARQ information for the first sidelink information sent by the transmit end, the first periodicity may not be 0. In this case, the first feedback slot exists in the first slot.

In this way, the receive end may determine, based on the position of the first slot in the first indication information and the first periodicity, a position of the first feedback slot that exists in the first slot, so that the first HARQ information can be fed back in the first feedback slot. Correspondingly, the transmit end may also determine, based on the position of the first slot in the first indication information and the first periodicity, the position of the first feedback slot that exists in the first slot, so that the first HARQ information can be received in the first feedback slot.

When the transmit end needs to feed back the second HARQ information for the received second sidelink information, the second periodicity may not be 0. In this case, the second feedback slot exists in the second slot.

Similarly, the transmit end may determine, based on the position of the second slot in the first indication information and the second periodicity, that the second feedback slot exists in the plurality of second slots, so that the second HARQ information can be fed back in the second feedback slot. Correspondingly, the receive end may determine, based on the position of the second slot in the first indication information and the second periodicity, that the second feedback slot exists in the plurality of second slots, so that the second HARQ information can be received in the second feedback slot.

In an implementation, the receive end receives the first sidelink information in the first slot, and if the first HARQ information is fed back in the first feedback slot, the first SCI further includes a first minimum time interval. The first minimum time interval is a minimum time interval between a first PSFCH and a first PSSCH corresponding to the first PSFCH, and the first PSFCH is for carrying the first HARQ information. In some embodiments, the first PSFCH exists in the first feedback slot, the first HARQ information transmitted in the first PSFCH is feedback information for data transmitted in the first PSSCH, and the first PSFCH and the corresponding first PSSCH are generally not in a same slot. A slot in which the first PSSCH is located is earlier than a slot in which the first PSFCH is located in time, and one first PSFCH may generally correspond to a plurality of first PSSCHs. Therefore, a time interval between the first PSFCH and a first PSSCH with a closest time interval in the plurality of first PSSCHs may be referred to as the first minimum time interval, and a unit of the first minimum time interval is a slot.

In an implementation, the transmit end receives the second sidelink information in the second slot, and if the second HARQ information is fed back in the second feedback slot, the first SCI further includes a second minimum time interval. The second minimum time interval is a minimum time interval between a second PSFCH and a second PSSCH corresponding to the second PSFCH, and the second PSFCH is for carrying the second HARQ information. For description of the second minimum time interval, refer to the first minimum time interval. Details are not described herein again.

In some embodiments, the transmit end may alternatively send the first minimum time interval and/or the second minimum time interval to the receive end through the higher layer signaling. For the minimum time interval, reference may be made to the description in FIG. 7. Details are not described herein again.

In the foregoing technical solution, the positions of the first slot and/or the second slot in the plurality of slots are indicated by the first indication information, and the first periodicity and/or the second periodicity are configured. The transmit end and/or the receive end can identify slots in which data is sent and/or received, and slots in which feedback information is sent and/or received.

A PSFCH configuration method in FIG. 8 is described in detail below by using a scenario in which the transmit end preempts a COT in an unlicensed band as an example. In this embodiment, a transmit end device and a receive end device perform data communication on a time-frequency resource configured by a base station for sidelink transmission.

Figure 9:
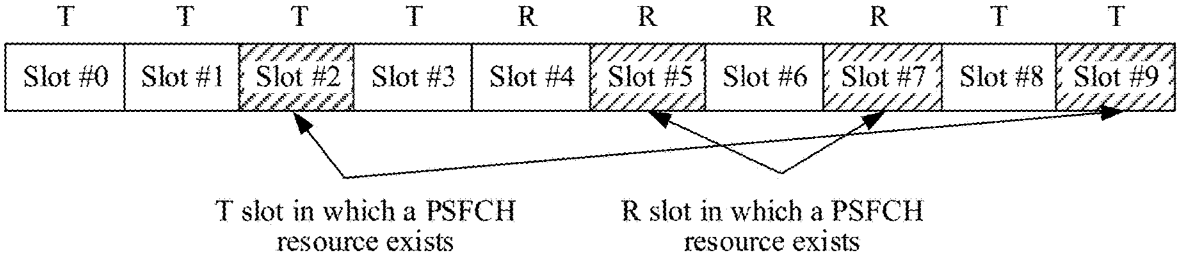
FIG. 9 is a diagram of a frame structure of another COT preempted by a transmit end according to an embodiment of this application.

Refer to FIG. 9. FIG. 9 is a schematic diagram of a frame structure of another COT preempted by a transmit end according to an embodiment of this application. In FIG. 9, each small grid represents a slot. It can be learned that small grids corresponding to all slots #0 to #9 represent one preempted COT, and the frame structure of the COT is TTTTRRRRTT. Each T or R corresponds to one slot. A correspondence is shown in FIG. 9. T indicates that a corresponding slot is used by the transmit end to send sidelink information, and R indicates that a corresponding slot is used by the transmit end to receive sidelink information. A slot configured as R in the COT may be shared to the receive end to send sidelink information.

With reference to the frame structure of the COT shown in FIG. 9, the following describes how to configure a PSFCH in an unlicensed frequency band.

Figure 10:
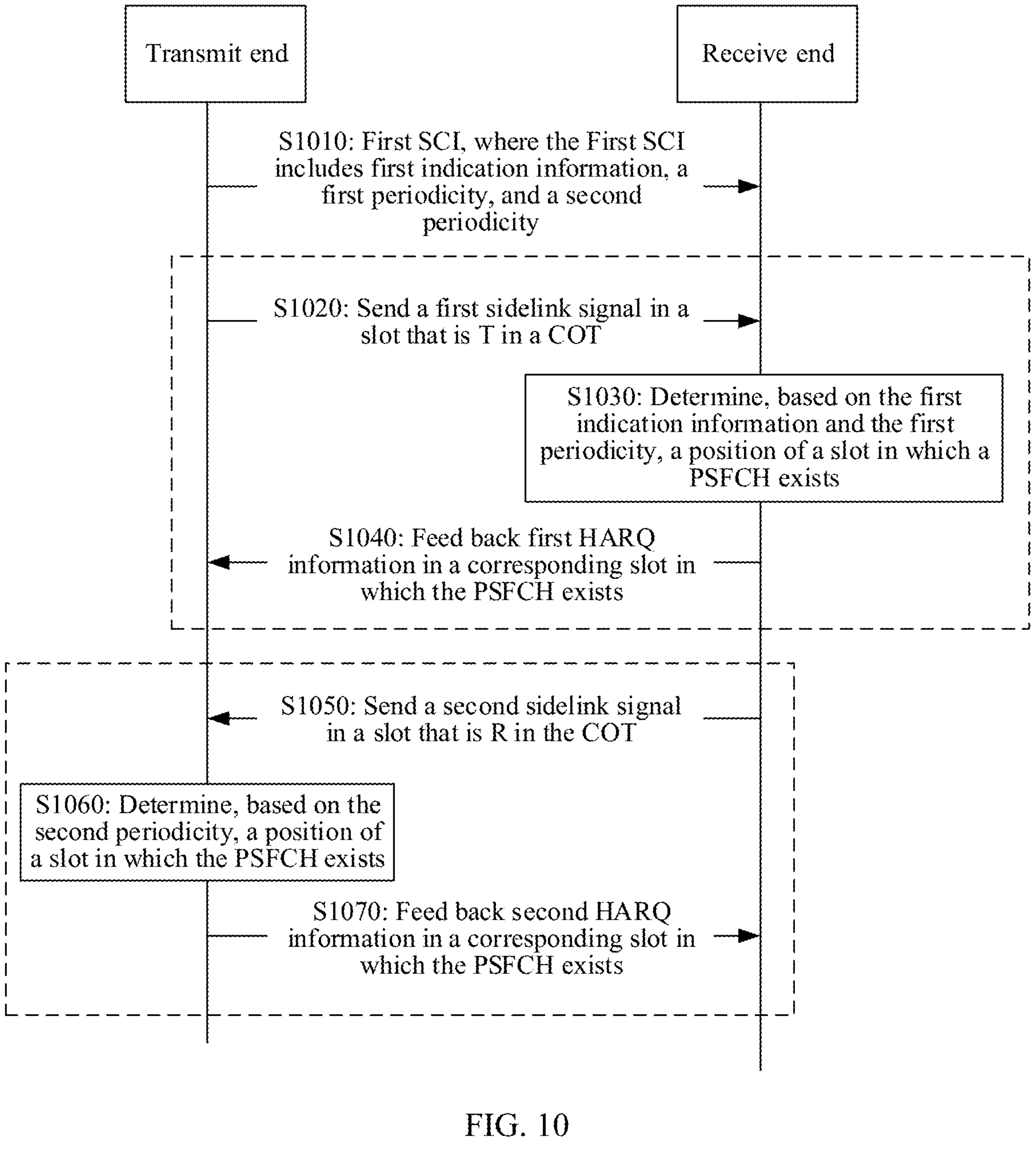
FIG. 10 is a flowchart of still another method for configuring a sidelink resource according to this application.

Refer to FIG. 10. FIG. 10 is a schematic flowchart of still another method for configuring a sidelink resource according to this application.

S1010: A transmit end sends first SCI in the slot #0. The first SCI includes first indication information, and the first indication information indicates frame structure information of a COT preempted by the transmit end.

Correspondingly, a receive end receives the first SCI in the slot #0.

It may be understood that the COT frame structure information is position information of T slots and R slots included in the COT.

In this embodiment, in S1010, a plurality of slots in the first indication information in S810 may be understood as the COT in FIG. 10, that is, the slot #0 to the slot #9. The first slot in S810 may be understood as a slot that is T in the COT. That is, the slot #0 to the slot #3, and the slot #8 and the slot #9. The second slot may be understood as a slot that is R in the COT, that is, the slot #4 to the slot #7.

In some embodiments, the first indication may indicate an index of the frame structure of the COT preempted by the transmit end, and the receive end may determine information about the frame structure of the COT based on the index of the frame structure of the COT.

In some embodiments, the first indication information may indicate frame structure information of the COT preempted by the transmit end. For example, 0 may be used for indicating that a corresponding slot is used by the transmit end to send sidelink information (that is, 0 represents T), and 1 may be used for indicating that a corresponding slot is used by the transmit end to receive sidelink information (that is, 1 represents R). In this way, the frame structure information TTTTRRR of the COT may be represented as 00001111, and vice versa.

In addition, the first SCI further includes a first periodicity and/or a second periodicity. It can be learned from FIG. 7 that a PSFCH is for carrying HARQ information to feed back a demodulation result of a PSSCH. In this way, in the COT preempted in FIG. 9 in this embodiment, the first periodicity may be understood as a periodicity of a slot in which a PSFCH exists in slots that are T in the COT, and the second periodicity may be understood as a periodicity of a slot in which a PSFCH exists in slots that are R in the COT. It can be learned from FIG. 9 that the first periodicity is 3, indicating that in the slots that are T in the COT, there is a slot including a PSFCH every three slots starting from the slot #0. That is, the slots in which the PSFCH exists in the slots that are T in the COT are the slot #2 and the slot #9. The second periodicity is 2, indicating that in the slots that are R in the COT, there is a slot including a PSFCH every two slots starting from the slot #4. That is, the slots in which the PSFCH exists in the slots that are R in the COT are the slots #5 and #7.

In some embodiments, if the transmit end needs to send sidelink information, and the receive end needs to feed back HARQ information for the sent sidelink information, operations S1020 to S1040 are performed.

S1020: The transmit end sends first sidelink information in a slot that is Tin the COT.

Correspondingly, the receive end receives the first sidelink information in a slot that is T in the COT. The first sidelink information is carried in a PSSCH corresponding to a slot for sending the first sidelink information.

S1030: The receive end determines, based on the first indication information and the first periodicity, a position of a slot in which a PSFCH exists in a slot that is T in the COT.

The receive end extracts, based on the frame structure information of the COT, a slot that is T in the frame structure of the COT, and calculates, based on a value of the first periodicity, the position of the slot that the PSFCH exists in the slot that is T in the COT. In some embodiments, the receive end extracts the slot #0 to the slot #3 and the slot #8 and the slot #9 based on the first indication information. Because the first periodicity is 3, the receive end may determine that a slot including a PSFCH exists every three slots starting from the slot #0, that is, slots in which a PSFCH exists in the slots that are T in the COT is the slot #2 and the slot #9.

S1040: The receive end feeds back the first HARQ information in a corresponding slot in which a PSFCH exists. The first HARQ information includes a demodulation result of the first sidelink information.

The first SCI further includes a first minimum time interval, and the first minimum time interval is a minimum time interval between a PSFCH of the HARQ information fed back in a slot that is T in the COT and a PSSCH corresponding to the HARQ information. An example in which the first minimum time interval is two slots is used herein to describe how the receive end determines a slot in which the PSFCH exists to feed back the HARQ information corresponding to the PSSCH.

Because the first minimum time interval is 2, sidelink information #0 received by the receive end in the slot #0 may feed back corresponding HARQ information #0 in the slot #2, and sidelink information #3 received by the receive end in the slot #3 may feed back corresponding HARQ information #3 in the slot #9. Because the slot #2 can only feed back the HARQ information #0 at latest, and the slot #9 can only feed back the HARQ information #3 at latest, for both the sidelink information #1 received in the slot #1 and the sidelink information #2 received in the slot #2, corresponding HARQ feedback needs to be performed in the slot #9.

Similarly, the transmit end receives the first HARQ information in a corresponding slot in which a PSFCH exists according to the foregoing operations, and details are not described herein again.

Because the transmit end shares some slots (for example, R in FIG. 9) in the COT with the receive end to send data. In some embodiments, after the receive end decodes the frame structure information of the COT indicated in the first SCI sent by the transmit end, if there is sidelink information for sending, and the transmit end needs to feed back the HARQ information for the sent sidelink information, operations S950 to S970 are performed.

S1050: The receive end sends second sidelink information in a slot that is R in the COT.

Correspondingly, the transmit end receives the second sidelink information in the slot that is R in the COT. The second sidelink information is carried in a PSSCH corresponding to the slot for sending the second sidelink information.

S1060: The transmit end determines, based on the frame structure information of the COT and the second periodicity, a position of a slot in which a PSFCH exists.

The transmit end extracts, based on the frame structure information of the COT, a slot that is R in the frame structure of the COT, and calculates, based on a value of the second periodicity, a position of a slot in which a PSFCH exists in the slot that is R in the COT. In some embodiments, the transmit end extracts the slot #4 to the slot #7. Because the second periodicity is 2, the transmit end may determine that a slot including a PSFCH exists every two slots starting from the slot #4. That is, the slots in which the PSFCH exists in the slots that are R in the COT are the slots #5 and #7.

S1070: The transmit end feeds back second HARQ information in a corresponding slot in which a PSFCH exists. The second HARQ information includes a demodulation result of the second sidelink information.

The first SCI further includes a second minimum time interval, and the second minimum time interval is a minimum time interval between a PSFCH of the HARQ information fed back in a slot that is R in the COT and a PSSCH corresponding to the HARQ information. An example in which the second minimum time interval is two slots is used herein to describe how the receive end determines a slot in which the PSFCH exists to feed back the HARQ information corresponding to the PSSCH.

Because the second minimum time interval is 2, the receive end feeds back corresponding HARQ information #5 in the slot #7 of the sidelink information #5 received in the slot #5. Because the slot #7 can only feed back the HARQ information #5 at latest, the slot #5 does not meet a condition for feeding back HARQ information #4 corresponding to sidelink information #4 received in the slot #4 (that is, does not meet the second minimum time interval), the HARQ information #4 needs to be fed back in the slot #7.

Similarly, the receive end receives the second HARQ information in the corresponding slot in which the PSFCH exists according to the foregoing operations. Details are not described herein again.

In the foregoing technical solution, a configuration manner of a PSFCH resource is changed from a static periodic configuration manner to a dynamic and flexible configuration manner. In this application, a dynamic and flexible configuration manner avoids a problem that a fixed configuration manner of a PSFCH resource does not match an actual COT of a transmit end, and periodic information of the PSFCH is dynamically indicated in the SCI, so that an occurrence frequency and a position of the PSFCH can be flexibly configured.

It should be noted that in this embodiment of this application, for a slot in which a PSFCH exists, a slot 2 in FIG. 9 is used as an example herein. If the receive end needs to perform HARQ feedback in a PSFCH in the slot 2, the receive end needs to perform LBT or transmit/receive switching before using the PSFCH. In other words, the transmit end needs to reserve a blank symbol for the receive end to perform LBT or transmit/receive switching before a symbol in which a PSFCH exists in the slot 2. However, existence of a PSFCH in the slot is not considered in a configuration manner of the blank symbol corresponding to FIG. 5. Therefore, if the receive end finds that a slot is a slot in which a PSFCH exists, the indication information that indicates whether a blank symbol exists in the slot in the embodiments corresponding to FIG. 4, FIG. 5, and FIG. 6 is invalid herein, and the receive end may ignore the indication information and determines a position of the blank symbol in the slot in a predetermined or specified manner.

Figure 11:
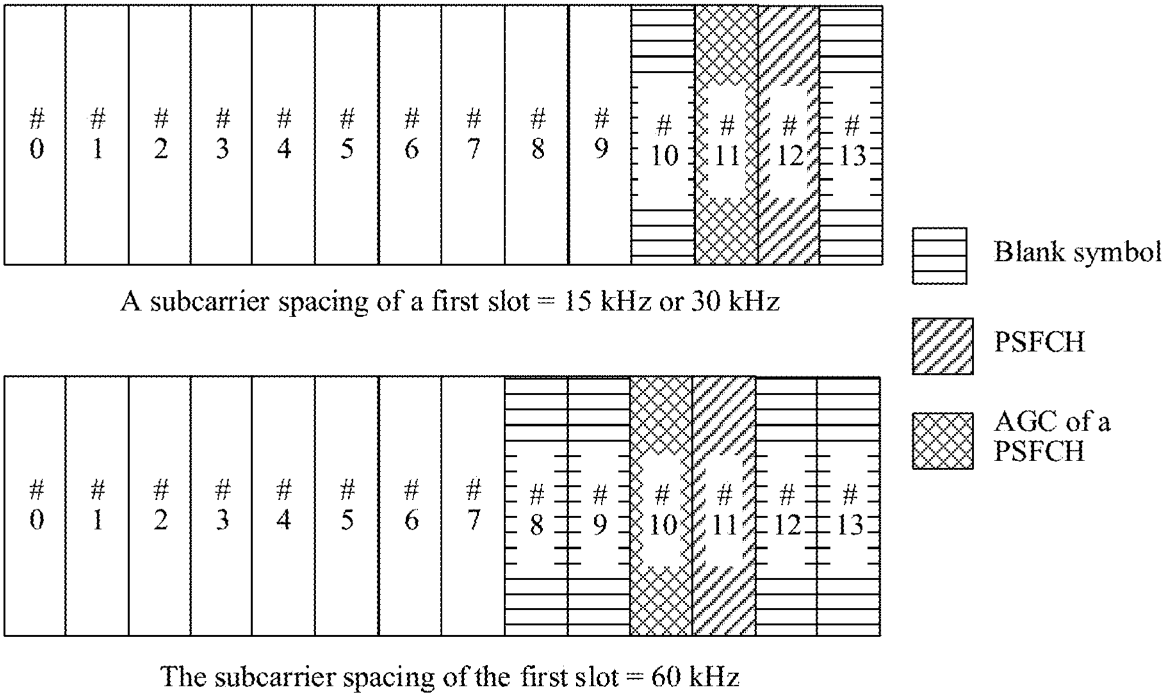
FIG. 11 is a diagram of a pattern of reserved blank symbols when a subcarrier spacing of a slot in which a PSFCH resource exists is 15 kHz, 30 kHz, or 60 kHz according to an embodiment of this application.

Refer to FIG. 11. FIG. 11 is a schematic diagram of a pattern of reserved blank symbols when a subcarrier spacing of a slot in which a PSFCH resource exists is 15 kHz, 30 kHz, or 60 kHz according to an embodiment of this application. All grids corresponding to sequence numbers 0 to 13 represent one sidelink slot, and each grid represents one symbol. It can be learned from FIG. 11 that when the subcarrier spacing of the first slot is 15 kHz or 30 kHz, the transmit end reserves last one symbol (that is, a symbol corresponding to #13) and a last fourth symbol (that is, a symbol corresponding to #10) in the first slot as blank symbols. Alternatively, the subcarrier spacing of the first slot is 60 kHz, and the transmit end reserves last two symbols (that is, symbols corresponding to #12 and #13) and last fifth and sixth symbols (that is, symbols corresponding to #8 and #9) in the first slot as blank symbols. Therefore, it may be understood that, when a PSFCH exists in a slot, positions of blank symbols in the slot are symbols before AGC of the PSFCH and symbols after the PSFCH. A quantity of symbols may be one or two, and a quantity is determined by a subcarrier spacing.

It should be understood that both the transmit end and the receive end in this application are classified based on a sending direction or a receiving direction of the SCI in the foregoing method embodiment. However, this does not mean that the transmit end in this embodiment of this application can only be configured for sending, but cannot be configured for receiving, and does not mean that the receive end in this embodiment of this application can only be configured for receiving, but cannot be configured for sending. In some implementations, the transmit end and the receive end may alternatively be exchanged. That is, the receive end may alternatively be the transmit end in the foregoing method embodiment, and the transmit end may alternatively be the receive end in the foregoing method embodiment.

It may be understood that the transmit end and the receive end in all embodiments of this application may be terminal devices.

The foregoing describes in detail the method for configuring a sidelink resource provided in this application, and the following describes a communication apparatus provided in this application.

Figure 12:
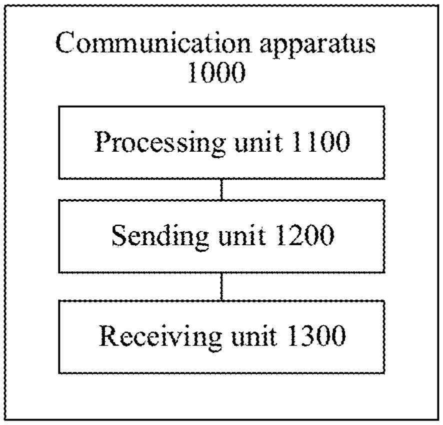
FIG. 12 is a block diagram of a communication apparatus 1000 according to this application.

Refer to FIG. 12. FIG. 12 is a schematic block diagram of a communication apparatus 1000 according to this application. As shown in FIG. 12, the communication apparatus 1000 includes a receiving unit 1100 and a processing unit 1200.

The receiving unit 1100 is configured to receive first sidelink control information SCI in a first slot. The first SCI includes first indication information, the first indication information indicates whether a blank symbol exists in the first slot, and the blank symbol is located in last N symbols of the first slot, where N is a natural number. The processing unit 1200 is configured to determine, based on the first indication information, whether the blank symbol exists in the first slot.

In some embodiments, in an embodiment, if the first indication information indicates that the blank symbol exists in the first slot, the processing unit 1200 is further configured to determine the quantity N of blank symbols in the first slot based on the first indication information and a subcarrier spacing of the first slot.

In some embodiments, in another embodiment, the subcarrier spacing of the first slot is 15 kHz or 30 kHz, and the quantity N of blank symbols is 1. Alternatively, the subcarrier spacing of the first slot is 60 kHz, and the quantity N of blank symbols is 2.

In some embodiments, the communication apparatus 1000 may further include a sending unit 1300, configured to perform a sending action.

In some other solutions, units of the communication apparatus 1000 are further configured to perform the following operations.

The receiving unit 1100 is configured to receive first sidelink control information SCI. The first SCI includes the first indication information, and the first indication information indicates positions of the first slot and/or a second slot in a plurality of slots. The first slot is for a first terminal device to receive first sidelink information, and the second slot is used by the first terminal device to send second sidelink information. A first feedback slot is determined based on the position of the first slot in the plurality of slots and a first periodicity, and a second feedback slot is determined based on the position of the second slot in the plurality of slots and a second periodicity. The first periodicity is a periodicity of the first feedback slot in the first slot, the first feedback slot includes a first physical sidelink feedback channel PSFCH, and the first PSFCH is configured to send first hybrid automatic repeat request HARQ information. The second periodicity is a periodicity of the second feedback slot in the second slot, the second feedback slot includes a second PSFCH, and the second PSFCH is configured to receive second HARQ information.

In some embodiments, in an embodiment, the first periodicity or the second periodicity is carried in the first SCI or higher layer signaling.

In some other solutions, units of the communication apparatus 1000 are further configured to perform the following operations.

The receiving unit 1100 is configured to receive the first sidelink control information SCI in the first slot. The first sidelink control information SCI includes the first indication information and the first periodicity. The first indication information indicates a direction of each slot in a channel occupancy time COT obtained by a second terminal device, the direction of each slot is a corresponding direction of sending or receiving sidelink information when the second terminal device uses the slot. The first periodicity is a periodicity of a slot in which a PSFCH exists in slots for the second terminal device to send sidelink information in the COT. The first slot is a slot in the slots for the second terminal device to send sidelink information. The receiving unit 1100 is further configured to receive the first sidelink information from the second terminal device in the COT. The processing unit 1200 is configured to determine the position of the second slot based on position information corresponding to a slot for the second terminal device to send a sidelink signal in the COT and the first periodicity. The second slot is a slot in which a PSFCH exists in the slots for the second terminal device to send sidelink information in the COT. The sending unit 1300 is configured to send first HARQ information to the second terminal device in a corresponding PSFCH of the second slot, where the first HARQ information includes a demodulation result of the first sidelink information.

In some embodiments, in an embodiment, the first sidelink control information SCI further includes a first minimum time interval. The sending unit 1300 is further configured to send the first HARQ information to the second terminal device in the PSFCH in the corresponding first slot based on the first minimum time interval. The first minimum time interval is a minimum time interval at which the first terminal device configured with the communication apparatus 1000 performs HARQ feedback on the first sidelink information.

In some embodiments, in another embodiment, the first sidelink control information SCI further includes a second periodicity, and the second periodicity is a periodicity of a slot in which a PSFCH exists in the slots for the second terminal device to send sidelink signal in the COT. The method further includes the following operations. The processing unit 1300 is configured to determine a position of a third slot based on position information corresponding to a slot for the second terminal device to receive sidelink information in the COT and the second periodicity, where the third slot is a slot in which a PSFCH exists for the second terminal device to receive sidelink information in the COT. The sending unit 1300 is configured to send the second sidelink information to the second terminal device in the COT. The receiving unit 1100 is configured to obtain second HARQ information from the second terminal device in the PSFCH in a corresponding third slot, where the second HARQ information includes a demodulation result of the second sidelink information.

In some embodiments, the receiving unit 1100 and the sending unit 1300 may alternatively be integrated into one transceiver unit, and have both receiving and sending functions. This is not limited herein.

In an implementation, the communication apparatus 1000 may be the receive end in the method embodiment. In this implementation, the sending unit 1300 may be a transmitter, and the receiving unit 1100 may be a receiver. The receiver and the transmitter may alternatively be integrated into a transceiver. The processing unit 1200 may be a processing apparatus.

In another implementation, the communication apparatus 1000 may be a chip or an integrated circuit installed in the receive end. In this implementation, the sending unit 1300 and the receiving unit 1100 may be a communication interface or an interface circuit. For example, the sending unit 1300 is an output interface or an output circuit, the receiving unit 1100 is an input interface or an input circuit, and the processing unit 1200 may be a processing apparatus.

A function of the processing apparatus may be implemented by hardware, or may be implemented by executing corresponding software by hardware. For example, the processing apparatus may include a memory and a processor. The memory is configured to store a computer program, and the processor reads and executes the computer program stored in the memory, so that the communication apparatus 1000 performs operations and/or processing performed by the receive end in the method embodiments. In some embodiments, the processing apparatus may include only a processor, and the memory configured to store the computer program is located outside the processing apparatus. The processor is connected to the memory through a circuit/wire, to read and execute the computer program stored in the memory. For another example, the processing apparatus may be a chip or an integrated circuit.

Figure 13:
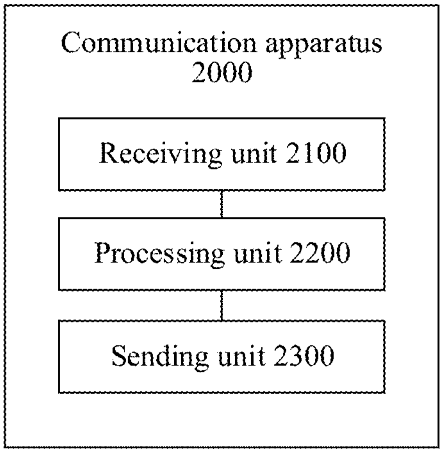
FIG. 13 is a block diagram of a communication apparatus 2000 according to this application.

Refer to FIG. 13. FIG. 13 is a schematic block diagram of a communication apparatus 2000 according to this application. As shown in FIG. 13, a communication apparatus 2000 includes a processing unit 2100 and a sending unit 2200.

The processing unit 2100 is configured to determine first indication information. The first indication information is carried in first sidelink control information SCI, the first indication information indicates whether a blank symbol exists in a first slot, and the blank symbol is located in last N symbols of the first slot, where N is a natural number. The sending unit 2200 is configured to send the first SCI in the first slot.

In some embodiments, in another embodiment, the processing unit 2100 is further configured to: determine the quantity N of blank symbols in the first slot based on a subcarrier spacing of the first slot.

In some embodiments, in another embodiment, the subcarrier spacing of the first slot is 15 kHz or 30 kHz, and the quantity N of blank symbols is 1. Alternatively, the subcarrier spacing of the first slot is 60 kHz, and the quantity N of blank symbols is 2.

In some embodiments, the communication apparatus 2000 may further include a receiving unit 2300, configured to perform a receiving action.

In some other solutions, units of the communication apparatus 2000 are further configured to perform the following operations.

The sending unit 2200 is configured to send first sidelink control information SCI. The first SCI includes the first indication information, the first indication information indicates positions of the first slot and/or a second slot in a plurality of slots, and the first slot is for a second terminal device to send first sidelink information, and the second slot is used by the second terminal device to receive second sidelink information. A first feedback slot is determined based on the position of the first slot in the plurality of slots and a first periodicity, and a second feedback slot is determined based on the position of the second slot in the plurality of slots and a second periodicity. The first periodicity is a periodicity of the first feedback slot in the first slot, the first feedback slot includes a first physical sidelink feedback channel PSFCH, and the first PSFCH is configured to receive first hybrid automatic repeat request HARQ information. The second periodicity is a periodicity of the second feedback slot in the second slot, the second feedback slot includes a second PSFCH, and the second PSFCH is configured to send second HARQ information.

In some embodiments, in an embodiment, the first periodicity or the second periodicity is carried in the first SCI or higher layer signaling.

In some other solutions, units of the communication apparatus 2000 are further configured to perform the following operations.

The sending unit 2200 is configured to send the first sidelink control information SCI in the first slot. The first sidelink control information SCI includes the first indication information and the first periodicity. The first indication information indicates a direction of each slot in the COT obtained by the second terminal device configured with the communication apparatus 2000, and the direction of each slot is a corresponding direction of sending or receiving sidelink information when the second terminal device uses the slot. The first periodicity is a periodicity in which a PSFCH exists in slots for the second terminal device to send sidelink information in the COT. The first slot is a slot in the slots for the second terminal device to send sidelink information. The sending unit 2200 is further configured to send first sidelink information to the first terminal device in the COT. The processing unit 2100 is configured to determine the position of the second slot based on position information corresponding to a slot for the second terminal device to send sidelink information in the COT and the first periodicity. The second slot is a slot in which a PSFCH exists in the slots for the second terminal device to send sidelink information in the COT. The receiving unit 2300 is configured to obtain first HARQ information from the first terminal device in a PSFCH in a corresponding second slot. The first HARQ information includes a demodulation result of the first sidelink.

In some embodiments, in an embodiment, the first sidelink control information SCI further includes the second periodicity. The second periodicity is a periodicity of a slot in which a PSFCH exists in the slots for the second terminal device to receive sidelink information in the COT. The method further includes the following operations. The processing unit 2100 is configured to determine a position of a third slot based on position information corresponding to a slot for the second terminal device to receive sidelink information and the second periodicity, where the third slot is a slot in which a PSFCH exists for the second terminal device to receive sidelink information in the COT. The receiving unit 2300 is configured to receive second sidelink information from the first terminal device in the COT. The sending unit 2200 is configured to send second HARQ information to the first terminal device in a PSFCH in a corresponding third slot, where the second HARQ information includes a demodulation result of the second sidelink.

In some embodiments, in another embodiment, the first sidelink control information SCI further includes a second minimum time interval, and the sending unit 2200 is further configured to: send the second HARQ information to the first terminal device in the PSFCH in the corresponding third slot based on the second minimum time interval, where the second minimum time interval is a minimum time interval at which the second terminal device configured with the communication apparatus performs HARQ feedback on the second sidelink information.

In some embodiments, the receiving unit 2300 and the sending unit 2200 may alternatively be integrated into one transceiver unit, and have both receiving and sending functions. This is not limited herein.

In an implementation, the communication apparatus 2000 may be the transmit end in the method embodiment. In this implementation, the sending unit 2200 may be a transmitter, and the receiving unit 2300 may be a receiver. The receiver and the transmitter may alternatively be integrated into a transceiver. The processing unit 2100 may be a processing apparatus.

In another implementation, the communication apparatus 2000 may be a chip or an integrated circuit installed in the transmit end. In this implementation, the sending unit 2200 and the receiving unit 2300 may be a communication interface or an interface circuit. For example, the sending unit 2200 is an output interface or an output circuit, the receiving unit 2300 is an input interface or an input circuit, and the processing unit 2100 may be a processing apparatus.

A function of the processing apparatus may be implemented by hardware, or may be implemented by executing corresponding software by hardware. For example, the processing apparatus may include a memory and a processor. The memory is configured to store a computer program, and the processor reads and executes the computer program stored in the memory, so that the communication apparatus 2000 performs operations and/or processing performed by the transmit end in the method embodiments. In some embodiments, the processing apparatus may include only a processor, and the memory configured to store the computer program is located outside the processing apparatus. The processor is connected to the memory through a circuit/wire, to read and execute the computer program stored in the memory. For another example, the processing apparatus may be a chip or an integrated circuit.

Figure 14:
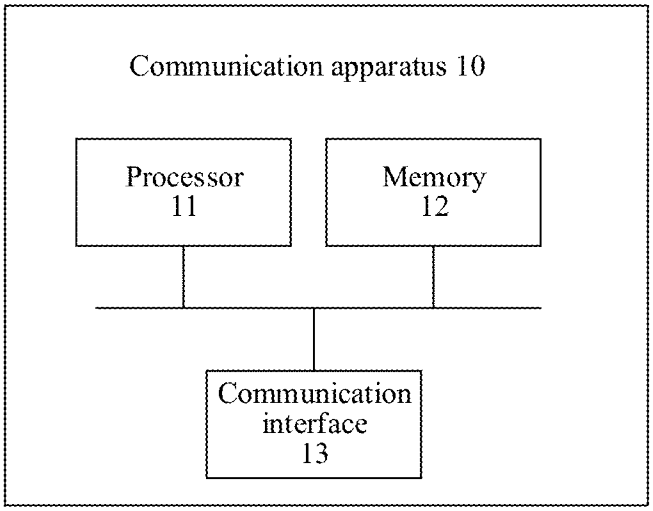
FIG. 14 is a diagram of a structure of a communication apparatus 10 according to this application.

Refer to FIG. 14. FIG. 14 is a schematic diagram of a structure of a communication apparatus 10 according to this application. As shown in FIG. 14, the communication apparatus 10 includes: one or more processors 11, one or more memories 12, and one or more communication interfaces 13. The processor 11 is configured to control the communication interface 13 to send and receive a signal, the memory 12 is configured to store a computer program, and the processor 11 is configured to invoke the computer program from the memory 12 and run the computer program, so that a procedure and/or an operation performed by a receive end in the method embodiments of this application is performed.

For example, the processor 11 may have a function of the processing unit 1200 shown in FIG. 12, and the communication interface 13 may have a function of the sending unit 1300 and/or the receiving unit 1100 shown in FIG. 12. In some embodiments, the processor 11 may be configured to perform processing or operations performed internally by the receive end in the method embodiments of this application, and the communication interface 13 is configured to perform sending and/or receiving actions performed by the receive end in the method embodiments of this application.

In an implementation, the communication apparatus 10 may be the receive end in the method embodiment. In this implementation, the communication interface 13 may be a transceiver. The transceiver may include a receiver and a transmitter.

In some embodiments, the processor 11 may be a baseband apparatus, and the communication interface 13 may be a radio frequency apparatus.

In another implementation, the communication apparatus 10 may be a chip installed in the receive end. In this implementation, the communication interface 13 may be an interface circuit or an input/output interface.

Figure 15:
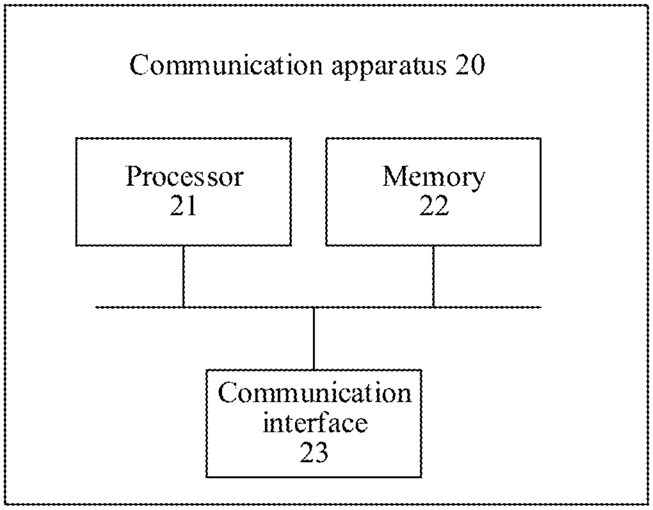
FIG. 15 is a diagram of a structure of a communication apparatus 20 according to this application.

Refer to FIG. 15. FIG. 15 is a schematic diagram of a structure of a communication apparatus 20 according to this application. As shown in FIG. 15, the communication apparatus 20 includes: one or more processors 21, one or more memories 22, and one or more communication interfaces 23. The processor 21 is configured to control the communication interface 23 to send and receive a signal, the memory 22 is configured to store a computer program, and the processor 21 is configured to invoke the computer program from the memory 22 and run the computer program, so that a procedure and/or an operation performed by the transmit end in the method embodiments of this application is performed.

For example, the processor 21 may have a function of the processing unit 2100 shown in FIG. 13, and the communication interface 23 may have a function of the sending unit 2200 and/or the receiving unit 2300 shown in FIG. 13. In some embodiments, the processor 21 may be configured to perform processing or operations performed internally by the transmit end in the method embodiments of this application. The communication interface 23 is configured to perform sending and/or receiving actions performed by the transmit end in the method embodiments of this application. Details are not described herein again.

In an implementation, the communication apparatus 20 may be the transmit end in the method embodiment. In this implementation, the communication interface 13 may be a transceiver. The transceiver may include a receiver and a transmitter.

In some embodiments, the processor 11 may be a baseband apparatus, and the communication interface 13 may be a radio frequency apparatus.

In another implementation, the communication apparatus 20 may be a chip installed in the transmit end. In this implementation, the communication interface 13 may be an interface circuit or an input/output interface.

In some embodiments, the processor and the memory in the foregoing apparatus embodiments may be physically independent units. Alternatively, the memory may be integrated with the processor. This is not limited in this disclosure.

In addition, this application further provides a computer-readable storage medium. The computer-readable storage medium stores computer instructions. When the computer instructions are run on a computer, operations and/or procedures performed by the receive end in method embodiments of this application are performed.

This application further provides a computer-readable storage medium. The computer-readable storage medium stores computer instructions. When the computer instructions are run on a computer, operations and/or procedures performed by the transmit end in the method embodiments of this application are performed.

This application further provides a computer program product. The computer program product includes computer program code or instructions. When the computer program code or the instructions are run on a computer, an operation and/or a procedure performed by the receive end in method embodiments of this application are performed.

This application further provides a computer program product. The computer program product includes computer program code or instructions. When the computer program code or the instructions are run on a computer, an operation and/or a procedure performed by the transmit end in method embodiments of this application are performed.

In addition, this application further provides a chip. The chip includes a processor. A memory configured to store a computer program is disposed independent of the chip. The processor is configured to execute the computer program stored in the memory, to perform an operation and/or processing performed by the receive end in any method embodiment.

Further, the chip may further include a communication interface. The communication interface may be an input/output interface, an interface circuit, or the like. Further, the chip may further include the memory.

This application further provides a chip. The chip includes a processor. A memory configured to store a computer program is disposed independent of the chip. The processor is configured to execute the computer program stored in the memory, to perform an operation and/or processing performed by the transmit end in any method embodiment.

Further, the chip may further include a communication interface. The communication interface may be an input/output interface, an interface circuit, or the like. Further, the chip may further include the memory.

In addition, this application further provides a communication system, including the receive end and the transmit end in embodiments of this application.

A processor in embodiments of this application may be an integrated circuit chip, and has a signal processing capability. During implementation, the operations in the foregoing method embodiments may be completed by using an integrated logic circuit of hardware in the processor or instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The general-purpose processor may be a microprocessor, or the processor may be any conventional processor, or the like. The operations of the methods disclosed in embodiments of this application may be directly presented as being performed and completed by a hardware encoding processor, or performed and completed by a combination of hardware and a software module in an encoding processor. A software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the operations in the foregoing methods in combination with hardware of the processor.

A memory in embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through example but not limitative description, RAMs in many forms are available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DRRAM). It should be noted that the memories of the systems and methods described herein are intended to include, but are not limited to, these and any other suitable types of memories.

A person of ordinary skill in the art may be aware that, in combination with the examples described in embodiments disclosed in this disclosure, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions of each particular application, but it should not be considered that the implementation goes beyond the scope of this application.

It may be clearly understood by a person skilled in the art that, for convenient and brief description, for a detailed working process of the foregoing system, apparatus, and units, refer to a corresponding process in the foregoing method embodiments, and details are not described herein again.

In the several embodiments provided in this application, it should be understood that the disclosed systems, apparatuses, and methods may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electronic form, a mechanical form, or another form.

The units described as separate parts may or may not be physically separate, and parts displayed as units may or may not be physical units, and may be located at one position, or may be distributed on a plurality of network units. Some or all of the units may be selected based on actual requirements to achieve the objectives of the solutions of the embodiments.

In addition, functional units in embodiments of this application may be integrated into one processing unit, or each of the units may exist alone physically, or two or more units are integrated into one unit.

The term "and/or" in this application is merely an association relationship for describing associated objects, and indicates that three relationships may exist. For example, A and/or B may represent: Only A exists, both A and B exist, and only B exists. A, B, and C may all be singular or plural, and are not limited.

When the functions are implemented in the form of a software functional unit and sold or used as an independent product, the functions may be stored in a computer-readable storage medium. Based on such an understanding, the technical solutions of this application essentially, or the part contributing to a conventional technology, or some of the technical solutions may be implemented in a form of a software product. The computer software product is stored in a storage medium, and includes several instructions for instructing a computer device (which may be a personal computer, a server, or a network device) to perform all or some of the operations of the methods described in embodiments of this application. The foregoing storage medium includes: any medium that can store program code, such as a USB flash drive, a removable hard disk, a ROM, a RAM, a magnetic disk, or an optical disc.

The foregoing descriptions are merely example implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for configuring a sidelink resource, comprising:

receiving first sidelink control information (SCI) in a first slot of a channel occupancy time (COT), wherein the first SCI comprises first indication information, the first indication information indicates whether a blank symbol exists in the same first slot of the COT, wherein the first slot is one of a plurality of slots within the COT, and different slots within the COT have varying blank symbol configurations, and the blank symbol is located in one of N last symbols of the same first slot, wherein N is a natural number;

determining, based on the first indication information, whether the blank symbol exists in the same first slot;

determining a quantity of blank symbols in the same first slot based on the first indication information and a subcarrier spacing of the same first slot in response to the first indication information indicating that the blank symbol exists in the same first slot of the COT; and performing listen before talk (LBT) or transmit or receive switching on the blank symbols of the same first slot of the COT.

2. The method according to claim 1, wherein the subcarrier spacing of the same first slot is 60 kHz, and the quantity of blank symbols is 2.

3. The method according to claim 2, wherein the subcarrier spacing of the same first slot is 15 kHz or 30 kHz, and the quantity of blank symbols is 1.

4. A method for configuring a sidelink resource, comprising:

determining first indication information, wherein the first indication information is carried in first sidelink control information (SCI), the first indication information indicates whether a blank symbol exists in a first slot of a channel occupancy time (COT) wherein the first slot is one of a plurality of slots within the COT, and different slots within the COT have varying blank symbol configurations, and the blank symbol is located in one of N last symbols of the first slot, wherein N is a natural number; and sending the first SCI in the same first slot of the COT.

5. The method according to claim 4, wherein the method further comprises determining a quantity of blank symbols in the same first slot of the COT based on a subcarrier spacing of the same first slot.

6. The method according to claim 5, wherein the subcarrier spacing of the same first slot is 15 kHz or 30 kHz, and the quantity of blank symbols is 1; or the subcarrier spacing of the same first slot is 60 kHz, and the quantity of blank symbols is 2.

7. An apparatus, comprising:

one or more processors; and one or more memories coupled to the one or more processors and storing programming instructions for execution by the one or more processors to cause the apparatus to:

receive first sidelink control information SCI in a first slot of a channel occupancy time (COT), wherein the first SCI comprises first indication information, the first indication information indicates whether a blank symbol exists in the same first slot of the COT, wherein the first slot is one of a plurality of slots within the COT, and different slots within the COT have varying blank symbol configurations, and the blank symbol is located in one of N last symbols of the first slot, wherein N is a natural number;

determine, based on the first indication information, whether the blank symbol exists in the same first slot;

determine a quantity of blank symbols in the same first slot based on the first indication information and a subcarrier spacing of the first slot in response to the first indication information indicating that the blank symbol exists in the same first slot of the COT; and perform listen before talk (LBT) or transmit or receive switching on the blank symbols of the same first slot of the COT.

8. The apparatus according to claim 7, wherein the subcarrier spacing of the same first slot is 15 kHz or 30 kHz, and the quantity of blank symbols is 1.

9. The apparatus according to claim 8, wherein the subcarrier spacing of the same first slot is 60 kHz, and the quantity of blank symbols is 2.

* * * * *